United States Patent
Anazawa et al.

(10) Patent No.: US 7,220,334 B2
(45) Date of Patent: May 22, 2007

(54) METHOD OF MANUFACTURING MICRODEVICE HAVING LAMINATED STRUCTURE

(75) Inventors: Takanori Anazawa, Sakura (JP); Atsushi Teramae, Yachimata (JP)

(73) Assignee: Kawamura Institute of Chemical Research, Sakura-shi (JP)

( * ) Notice: Subject to any disclaimer, the term of this patent is extended or adjusted under 35 U.S.C. 154(b) by 590 days.

(21) Appl. No.: 10/297,625

(22) PCT Filed: Jun. 20, 2001

(86) PCT No.: PCT/JP01/05242

§ 371 (c)(1),
(2), (4) Date: Dec. 17, 2002

(87) PCT Pub. No.: WO01/98199

PCT Pub. Date: Dec. 27, 2001

(65) Prior Publication Data

US 2003/0175162 A1 Sep. 18, 2003

(30) Foreign Application Priority Data

Jun. 20, 2000 (JP) .............................. 2000-184425

(51) Int. Cl.
*B44C 1/17* (2006.01)
*B31B 1/60* (2006.01)
*B29C 65/00* (2006.01)
*B32B 37/00* (2006.01)
*B01L 3/02* (2006.01)

(52) U.S. Cl. ...................... 156/235; 422/50; 422/68.1; 422/100; 422/102; 422/103; 422/104; 156/1; 156/60

(58) Field of Classification Search ................ 156/235, 156/1, 60; 422/100, 102, 103, 104, 50, 68.1
See application file for complete search history.

(56) References Cited

U.S. PATENT DOCUMENTS

| | | | | |
|---|---|---|---|---|
| 3,502,520 | A | | 3/1970 | Schwartz ........................ 156/6 |
| 5,607,540 | A | | 3/1997 | Onishi ...................... 156/379.8 |
| 5,639,423 | A | | 6/1997 | Northrup et al. ............. 122/50 |
| 6,136,212 | A | * | 10/2000 | Mastrangelo et al. ......... 216/49 |
| 6,287,438 | B1 | | 9/2001 | Knoll .......................... 204/409 |
| 6,569,607 | B2 | * | 5/2003 | McReynolds ............... 430/322 |
| 6,752,966 | B1 | * | 6/2004 | Chazan ....................... 422/102 |

FOREIGN PATENT DOCUMENTS

| | | |
|---|---|---|
| JP | 7-227909 | 8/1995 |
| JP | 7/84033 | 9/1995 |
| JP | 7-508928 | 10/1995 |
| JP | 8-136905 | 5/1996 |
| JP | 8-316625 | 11/1996 |
| JP | 10-264258 | 10/1998 |
| JP | 2888344 | 2/1999 |
| JP | 11-124403 | 5/1999 |
| JP | 2000-108161 | 4/2000 |
| WO | WO 94/05414 | 3/1994 |
| WO | WO 97/27475 | 7/1997 |
| WO | WO 99/00657 | 1/1999 |
| WO | WO 99/42805 | 8/1999 |
| WO | WO 00/33084 | 6/2000 |

OTHER PUBLICATIONS

Chinese Office Action w/English Translation dated Jul. 2, 2004.
R. M. McCormick et al.; Analytical Chemistry, vol. 69, No. 14, pp. 2626-2630; Jul. 15, 1997. Discussed in the specification.
M. A. Unger et al.; Science, vol. 288, pp. 113-116, Apr. 7, 2000. Discussed in the specification.
Supplementary European Search Report mailed Aug. 9, 2006, 3 pages.

* cited by examiner

*Primary Examiner*—Brian Sines
(74) *Attorney, Agent, or Firm*—Armstrong Kratz Quintos Hanson & Brooks, LLP

(57) ABSTRACT

The present invention provides a method of manufacturing a microdevice having a fine capillary cavity formed as a cut portion of a very thin layer which is likely to be broken, particularly a method of manufacturing a microdevice having complicated passages formed in three dimensions with high productivity. Also, the present invention provides a multi-functional microdevice which has a fine capillary passage formed by laminating plural resin layers, fine capillary cavities piercing through the respective layers to communicate and intersect three-dimensionally with each other, a space which should serve as a reaction chamber, a diaphragm valve, and a stopper structure. The method includes the steps of forming a semi-cured coating film having a cut portion made of an active energy ray curable composition on a coating substrate, laminating the semi-cured coating film with another member and removing the substrate, irradiating the semi-cured coating film again with an active energy ray before and/or after the removal of the substrate, thereby curing the coating film and bonding with said another member. The microdevice has a multi-layered structure wherein a member (J') {selected from a member having a cut portion piercing through the member, a member having a recessed cut portion on the surface, and a member having a cut portion piercing through the member and a recessed cut portion on the surface}, a member (K') and one or more active energy ray curable resin layers (X') having a cut portion at a portion of the layer, the cut portion having a minimum width within a range from 1 to 1000 μm, are laminated and two or more cut portions in the members are connected to form a cavity.

17 Claims, 9 Drawing Sheets

METHOD OF MANUFACTURING
MICRODEVICE HAVING LAMINATED
STRUCTURE

TECHNICAL FIELD

The present invention relates to a method of manufacturing microdevices, for example, microfluidic device having a microfluid passage therein, a microreaction device (microreactor) which is to be used in extensive fields such as chemistry, biochemistry, and physical chemistry, or microprobe analytical device having a microcavity therein and a structure such as fluid passage, reaction chamber, electrophoresis column, membrane separation mechanism or sensor formed in a member, which is useful as an integrated DNA analytical device, microelectrophoresis device or microchromatography device; and relates to microdevices obtained by the method.

More particularly, the present invention relates to a microdevice, which has a laminated structure comprising an active energy ray curable resin layer, the active energy ray curable resin layer having a cut portion of the resin in the layer, and has a fine capillary passage formed by laminating plural resin layers, the cut portions piercing through the respective layers to communicate with each other, a space which should serve as a reaction chamber, a diaphragm valve and a stopper structure.

The microdevice of the present invention is a microdevice comprising an active energy ray curable resin layer containing a hydrophobic radiation polymerizable compound (a) and an amphipathic polymerizable compound (b), which is copolymerizable with the hydrophobic radiation polymerizable compound, and the microdevice is less likely to adsorb a biological component.

Furthermore, the present invention relates to a method of manufacturing a microdevice, which comprises forming an active energy ray curable resin layer on a coating substrate, laminating the active energy ray curable resin layer having a resin cut portion formed by patterning exposure and development with another member in a semi-cured state, irradiating again with an active energy ray, thereby bonding the active energy ray curable resin layer with the another member and curing the active energy ray curable resin layer, and removing the coating substrate before, after, or during further irradiation with an active energy ray.

BACKGROUND ART

It has been known that fine grooves may be formed by an etching method using a base material such as silicon, quartz, glass or polymer to manufacture a liquid passage or a separation gel channel (for example, R. M. McCormick et al., "Analytical Chemistry", page 2626, Vol. 69, 1997), and that a cover such as a glass plate is used in a state of being fixed by screw-fastening, fusion, or bonding for the purpose of preventing vaporization of a liquid during the operation.

However, fixation by screw-screw-fastening is likely to cause leakage of a liquid between laminated base materials or between the base material and the cover, while fusion and bonding require a very long time, resulting in extremely poor productivity. According to the material and method, it is difficult to form a microdevice having a multi-layered structure wherein numerous passages and other void portions are formed continuously in three layers, and it is considerably difficult to form a microdevice wherein numerous fragile thin layers are laminated.

Also, the journal of "SCIENCE" (Vol. 288, page 113, 2000) discloses a method of forming a silicone rubber member having grooves on the surface using a casting method, interposing a silicone rubber sheet between two members and bonding them to form capillary passages which three-dimensionally intersect.

However, these two passages are independent passages and it was impossible to form thin capillary passages which pierce through the respective layers to communicate with each other. It was particularly impossible to industrially manufacture a microdevice having a multi-layered structure composed of a layer, which is too thin to support itself, using a flexible material and it was also impossible to manufacture a microdevice which can perform complicated reaction and analysis processes. Furthermore, there was a drawback in that the application is limited because the silicone rubber considerably adsorbs the biological substance and it requires a long time to cure the silicone rubber, resulting in extremely low productivity.

A microdevice formed of an active energy ray curable resin can be manufactured with very high productivity because bonding can be performed by a method of bringing an active energy ray curable resin into contact with another member in a semi-cured state and irradiating again with an active energy ray in that state, thereby completely curing the resin, without using an adhesive.

However, according to this method, it was difficult to laminate numerous films having a cut portion, which are too thin to support themselves while aligning the microcut portions from an industrial point of view. Particularly, in the case in which the cut portion of the resin layer is in the form of a continuous line, a curve or numerous lines, it becomes more difficult to handle the film. A method of forming capillary passages, which pierce through the respective layers to communicate with each other, is heretofore not known. Also, there is no known microdevice obtained by laminating three or more films each having a cut portion, which are made of an active energy ray curable resin and are too thin to support themselves, while aligning the microcut portions.

DISCLOSURE OF INVENTION

An object to be solved by the present invention is to provide a method of manufacturing a microdevice having a fine capillary cavity formed as a cut portion of a very thin layer which is likely to be broken, particularly a method of manufacturing a microdevice having complicated passages formed in three dimensions with high productivity, and to provide a multi-functional microdevice which has a fine capillary passage formed by laminating plural resin layers, fine capillary cavities piercing through the respective layers to communicate and three-dimensionally intersect with each other, a space which should serve as a reaction chamber, a diaphragm valve, and a stopper structure.

The present inventors have intensively researched the methods of achieving the above object and found that a microdevice having a cavity formed therein, particularly a microdevice comprising plural layers laminated continuously can be manufactured by forming a semi-cured coating film having a cut portion made of an active energy ray curable composition on a coating substrate, laminating the semi-cured coating film with another member and removing the substrate, irradiating the semi-cured coating film again with an active energy ray before and/or after the removal of the substrate, thereby curing the coating film and bonding with said another member. Thus, the present invention has been completed.

The present invention provides a method of manufacturing a microdevice having a laminated structure comprising one or more resin layers (X) having a cut portion, said resin layers being laminated with another member or another resin layer (X) to form a cavity composed of the cut portion, said method comprising:

(i) the step (i) of applying an active energy ray curable composition (x) containing a radiation polymerizable compound (a) on a coating substrate to form an uncured coating film, (ii) the step (ii) of irradiating the uncured coating film other than the portion, which should serve as the cut portion, with an active energy ray, thereby making the uncured coating film of the irradiated portion non-flowable or slightly flowable, and semi-curing to such an extent that unreacted active energy ray polymerizable functional groups remain to form a semi-cured coating film, (iii) the step (iii) of removing the uncured composition (x) of the non-irradiated portion from the semi-cured coating film to obtain a semi-cured coating film having a cut portion of the coating film, (iv) the step (iv) of laminating the semi-cured coating film having a cut portion with another member (J) to form a resin layer (X), (v) the step (v) of removing the coating substrate from the resin layer (X), thereby transfering the resin layer (X) onto the member (J), and (vi) the step (vi) of irradiating the resin layer (X) in a semi-cured state with an active energy ray, thereby further curing the resin later (X) and bonding the resin layer (X) with the member (J) after the step (iv) and before and/or after the step (v).

The present invention provides a method of manufacturing a microdevice, wherein the removal of the coating substrate in the step (v) is removal by dissolution of the coating substrate, or the step (vi) is provided before the step (v) and the removal of the coating substrate in the step (v) is performed by peeling, and a method of manufacturing a microdevice, wherein, after performing the steps (i), (ii), (iii), (iv) and (v), or the steps (i), (ii), (iii), (iv), (v) and (vi), or the steps (i), (ii), (iii), (iv), (vi) and (v) in this order, the steps (i) to (v) or the steps (i) to (vi) are repeated using the member (J) laminated with the resin layer (x) in place of the member (J) in the step (iv), thereby laminating plural resin layers (X).

The present invention provides a method of manufacturing a microdevice, wherein plural resin layers (X) are laminated so that at least the cut portions are partially laid one upon another to form a cavity composed of the connected cut portions of plural resin layers (X) in a laminate.

The present invention provides a method of manufacturing a microdevice, wherein the member (J) is a member having a cut portion piercing through the member, or a member having a recessed cut portion on the surface, or a member having a cut portion piercing through the member and a recessed cut portion on the surface, and the member (J) and the resin layer (X) are laminated so that at least the cut portion of the member (J) and the cut portion of the resin layer (X) are partially laid one upon another to form a cavity composed of the cut portion of the member (J) and the cut portion of the resin layer (X), which are connected with each other, in a laminate.

The present invention provides a method of manufacturing a microdevice, wherein, between the step (i) and the step (ii) and/or between the step (ii) and the step (iii) and/or between the step (iii) and the step (iv), a portion of the resin layer (X) is irradiated with an active energy ray, thereby partially curing the resin layer so that the irradiated portion is not bonded with another member in the step (iv) to form a portion, which is not bonded but is contacted with the another member or resin layer, in the resin layer (X).

The present invention provides a method of manufacturing a microdevice wherein irradiation with the active energy ray in the step (ii) is performed in the shape for forming a stopper to provide a portion of the resin layer (X) with a structure, which serves as the stopper, and the portion subjected to partial curing is a portion which serves as the stopper of the resin layer (X).

The present invention provides a method of manufacturing a microdevice, wherein the active energy ray curable composition (x) contains a hydrophobic radiation polymerizable compound (a) whose homopolymer exhibits a contact angle with water of 60 degrees or more, and an amphipathic polymerizable compound (b) which is copolymerizable with the hydrophobic radiation polymerizable compound.

Furthermore, the present invention provides a microdevice having a laminated structure comprising a member (J') {selected from a member having a cut portion piercing through the member, a member having a recessed cut portion on the surface, and a member having a cut portion piercing through the member and a recessed cut portion on the surface}, one or more active energy ray curable resin layers (X') having a cut portion at a portion of the layer, the cut portion having a minimum width within a range from 1 to 1000 μm, and a member (K') {selected from a member having a cut portion piercing through the member, a member having a recessed cut portion on the surface, and a member having a cut portion piercing through the member and a recessed cut portion on the surface}, which are laminated, while two or more cut portions in the members are connected to form a cavity.

The present invention provides a microdevice wherein one or more members selected from the member (J'), the resin layer (X') and the member (K') has one or more linear cavity provided parallel to the laminated surface of the members, or a microdevice wherein a portion of the cavity is a fluid passage and plural passages formed in different resin layers (X') or branched passages intersect three-dimensionally across the resin layer (X').

The present invention provides a microdevice which has a portion that is not bonded but is contacted with another member laminated adjacent to a portion of one or more members selected from the member (J'), the resin layer (X') and the member (K').

The present invention provides a microdevice wherein a portion of at least one resin layer (X') is provided with a structure, which serves as a stopper by replacing a portion of the peripheral portion by a cut portion and the portion, which is not bonded but is contacted with another member laminated adjacent thereto, is the stopper.

The present invention provides a microdevice wherein at least one member selected from the member (J'), the resin layer (X') and the member (K') is directly laminated with a member, which serves as a diaphragm, at one surface and is directly laminated with another member having a cut portion at the other surface, and the cut portions form a cavity by lamination, while another member laminated on the back surface of the member, which serves as the diaphragm, has orifice-shaped cut portions, which serve as an inlet and/or an outlet to the cavity, at least one of the inlet and the outlet being formed across the member from the diaphragm, and the peripheral portion does not contact with the diaphragm and the passage can be closed by deforming the diaphragm to contact with the peripheral portion of at least one of the inlet and the outlet.

The present invention provides a microdevice wherein the active energy ray curable composition contains an amphipathic radiation polymerizable compound which is copolymerizable with a radiation polymerizable compound, or a microdevice wherein a member (J') {selected from a member having a cut portion piercing through the member, a member having a recessed cut portion on the surface, and a member having a cut portion piercing through the member and a recessed cut portion on the surface), one or more active energy ray curable resin layers (X') having a cut portion at a portion of the layer, the cut portion having a minimum width within a range from 1 to 1000 μm, and a member (K") having no cut portion, which serves as a diaphragm, are laminated and the member (K") has a portion, which is not bonded but is contacted with another member laminated adjacent thereto, the portion being a diaphragm portion, while two or more cut portions in the member (J') and the resin layer (X') are connected to form a cavity, and a microdevice manufactured by a manufacturing method according to the present invention described above.

BEST MODE FOR CARRYING OUT THE INVENTION

Figure 1:
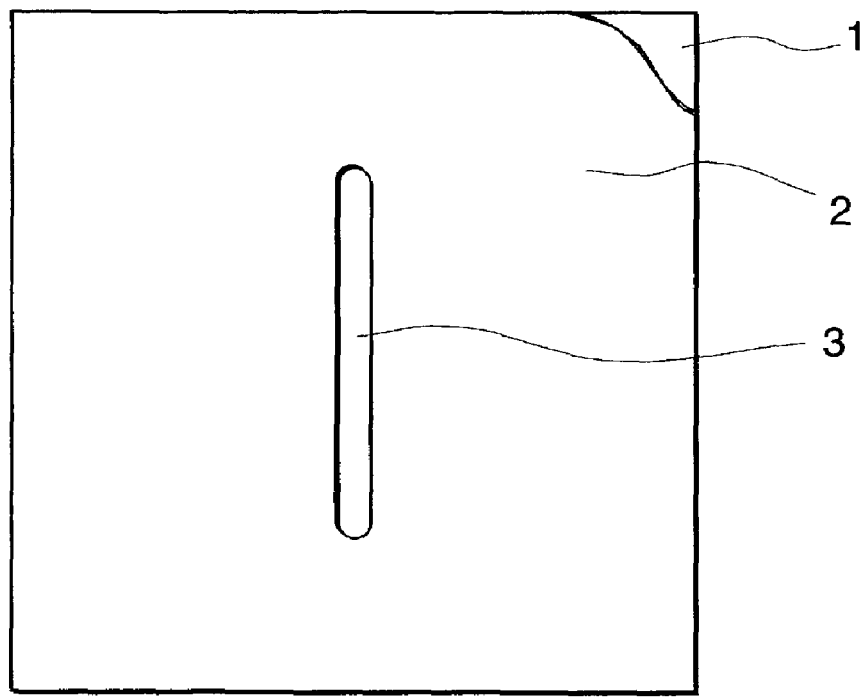
FIG. 1 is a plan view schematically showing a coating substrate and a resin layer (X-1) used in Example 1 and Example 3 viewed from a direction perpendicular to the surface.

The method of the present invention relates to a method of manufacturing a microdevice, which comprises laminating and bonding one resin layer having a resin cut portion (hereinafter, such a resin layer is referred to as a "resin layer (X)") or two or more resin layers (X) having passages each having the same or different shape as another member and laminating the resin layer (X) with another member or another resin layer (X), and thus the cut portion forms a cavity.

The coating substrate used in the method of the present invention can be coated with an active energy ray curable composition (x) (hereinafter occasionally abbreviated to a "composition (x)") and can be removed after curing the composition (x). In the present invention, coating includes casting and the coating film includes cast articles.

It is not necessary to specifically limit the shape of the coating substrate, and the coating substrate can take any form according to the purpose. For example, the coating substrate can be in the form of sheet (including film, ribbon and belt), plate, roll (obtained by using a large roll as the coating substrate and performing the steps of coating, semi-curing, lamination and peeling during the roll rotates one time) and molded article or mold having a complicated shape. In view of ease of coating of the active energy ray curable composition (x) thereon and ease of irradiation with an active energy ray, the surface to be bonded is preferably in the form of a plane or secondary curved surface, and is particularly preferably a pliable sheet. In view of the productivity, it is preferably in the form of a roll.

The coating substrate may be provided with measures, figures, and aligning symbols printed on the surface. The material of the coating substrate is not specifically limited as long as it satisfies the above conditions, and examples thereof include polymer, glass, crystal such as quartz, ceramic, semiconductor such as silicon, metal, paper, nonwoven fabric and woven fabric. Among these materials, polymer and metal are particularly preferred.

The polymer used as the coating substrate may be a homopolymer or a copolymer, or may be a thermoplastic polymer or a thermosetting polymer. In view of the productivity, the polymer used as the coating substrate is preferably a thermoplastic polymer or active energy ray curable polymer.

In the case in which the coating substrate is removed by peeling using a mechanical force, as the material which is not easily dissolved in various active energy ray curable compositions (x) and is easily peeled off from the cured article thereof, polyolefin polymer, chlorine-containing polymer, fluorine-containing polymer, polythioether polymer, polyether ketone polymer and polyester polymer are preferably used.

In the case in which the coating substrate is removed by dissolution, for example, there can be preferably used water-soluble resin such as polyvinyl pyrrolidone, polyethylene glycol, polyvinyl alcohol or acrylic copolymer; lower alcohol-soluble resin having a polyether group such as polyethylene glycol group and a hydroxyl group; alkali-soluble resin such as carboxyl group-, phosphoric acid group- or sulfone group-containing resin; and acid-soluble resin such as amino group- or quaternary ammonium salt-containing resin.

The coating substrate may be composed of a polymer blend or a polymer alloy, or may be a laminate or a composite. Furthermore, the coating substrate may contain additives such as modifiers, colorants, fillers and reinforcers.

The coating substrate may be surface-treated in the case of the polymer and other materials. The surface treatment may be performed for the purpose of prevention of dissolution by the composition (x), ease of peeling of the composition (x) from the cured article, improvement in wettability of the composition (x) and prevention of contamination with the composition (x).

The surface treatment of the coating substrate may be performed by any method and examples thereof include corona treatment, plasma treatment, flame treatment, acid or alkali treatment, sulfonation treatment, fluorination treatment, primer treatment with silane coupling agent, surface graft polymerization, coating of surfactants and releasants, and physical treatment such as rubbing or sand blasting.

In the case in which an active energy ray curable composition (x) is applied on the coating substrate in a small thickness, the coating substrate is preferably wetted with the composition (x) or preferably has a weak repellency. That is, a contact angle with the composition (x) is preferably 90 degrees or less, more preferably 45 degrees or less, still more preferably 25 degrees or less, and most preferably 0 degree.

In the case in which the coating substrate is a material having a low surface energy, for example, polyolefin, fluorine polymer, polyphenylene sulfide or polyether ether ketone, the contact angle with the composition (x) is preferably reduced by the surface treatment of the bonding surface of the coating substrate.

However, it is necessary to control the degree of the treatment to prevent the active energy ray curable composition (x) cured by the surface treatment from being bonded too firmly to peel off. As the surface treatment for improvement of the wettability, for example, corona discharge treatment, plasma treatment, acid or alkali treatment, sulfonation treatment, primer treatment and coating of surfactants are preferred.

In the case in which the coating substrate is formed of a material which has good adhesion, thereby making it difficult to peel a cured article of the active energy ray curable composition (x), the surface treatment such as fluorination treatment, coating of fluorine or silicone releasants or introduction of a hydrophilic group or hydrophobic group by a surface graft method is preferred. In the case in which the coating substrate is a porous material such as paper, nonwoven fabric, or knitted woven fabric, the coating substrate is preferably subjected to a fluorine compound treatment or made non-porous by coating in order to prevent contamination with the composition (x). Also, the wettability can be controlled by selecting modifiers to be blended with the coating substrate, in addition to the surface treatment.

Examples of the modifier, which can be mixed with the coating substrate, include hydrophobizing agents (water repellents) such as silicone oil or fluorine-substituted hydrocarbon; hydrophilizing agents such as water-soluble polymer, surfactant, inorganic powders (e.g. silica gel); and plasticizers such as dioctyl phthalate. Examples of the colorant, which can be mixed with the coating substrate, include any dyes or pigments, fluorescent dyes or pigments, and ultraviolet absorbers. Examples of the reinforcer, which can be mixed with the coating substrate, include inorganic powders such as clay; and inorganic and organic fibers or fabrics.

The radiation polymerizable compound (a) (hereinafter occasionally abbreviated to "compound (a)") used in the present invention may be any radical polymerizable, anion polymerizable or cation polymerizable compound as long as it is polymerized and cured by irradiation with an active energy ray. The compound (a) is not limited to a compound which is polymerized in the absence of a polymerization initiator, and a compound which is polymerized by irradiation with an active energy ray only in the presence of the polymerization initiator.

The compound (a) is preferably an addition-polymerizable compound because of high polymerization rate, more preferably a compound having a polymerizable carbon-carbon double bond as an active energy ray polymerizable functional group, and particularly preferably a (meth)acrylate compound and vinyl ethers, which have high reactivity, and a maleimide compound which is cured even in the absence of the photopolymerization initiator.

Furthermore, the compound (a) is preferably a compound, which is polymerized to form a crosslinked polymer, because it exhibits high shape retention in a semi-cured state and also exhibits high strength after curing. Therefore, a compound having two or more polymerizable carbon-carbon double bonds in a molecule (hereinafter "possession of two or more polymerizable carbon-carbon double bonds in a molecule" is occasionally referred to as "polyfunctional") is more preferred.

Examples of the polyfunctional (meth)acrylate monomer, which can be preferably used as the compound (a) include difunctional monomer such as diethylene glycol di(meth)acrylate, neopentyl glycol di(meth)acrylate, 1,6-hexanediol di(meth)acrylate, 2,2'-bis(4-(meth)acryloyloxypolyethyleneoxyphenyl)propane, 2,2'-bis(4-(meth)acryloyloxypolypropyleneoxyphenyl)propane, hydroxydipivalate neopentyl glycol di(meth)acrylate, dicyclopentanyl diacrylate, bis(acryoxyethyl)hydroxyethyl isocyanurate or N-methylenebisacrylamide; trifunctional monomer such as trimethylolpropane tri(meth)acrylate, trimethylolethane tri(meth)acrylate, tris(acryloxyethyl) isocyanurate or caprolactone-modified tris(acryloxyethyl) isocyanurate; tetrafunctional monomer such as pentarythritol tetra(meth)acrylate; and hexafunctional monomer such as dipentarythritol hexa(meth)acrylate.

As the compound (a), a polymerizable oligomer (including prepolymer, the same as in the following case) can be used and includes, for example, a compound having a weight-average molecular weight within a range from 500 to 50000. Examples of the polymerizable oligomer include (meth)acrylate ester of epoxy resin, (meth)acrylate ester of polyether resin, (meth)acrylate ester of polybutadiene resin, and polyurethane resin having a (meth)acryloyl group at a molecular terminal.

Examples of the maleimid compound (a) include difunctional maleimide such as 4,4'-metyhylenebis(N-phenyl maleimide), 2,3-bis(2,4,5-trimethyl-3-thienyl)maleimide, 1,2-bis maleimideethane, 1,6-bis maleimidehexane, triethylene glycol bis maleimide, N,N'-m-phenylene dimaleimide, m-tolylene dimaleimide, N,N'-1,4-phenylene dimaleimide, N,N'-diphenylmethane dimaleimide, N,N'-diphenyl ether dimaleimide, N,N'-diphenylsulfone dimaleimide, 1,4-bis (maleimideethyl)-1,4-diazoniabicyclo-[2,2,2]octane dichloride or 4,4'-isopropylidenediphenyl=dicyanate·N,N'-(methylenedi-p-phenylene)dimaleimide; and maleimide having a maleimide group and a polymerizable functional group other than the maleimide group, such as N-(9-acridinyl)maleimide. The maleimide monomer can also be copolymerized with a compound having a polymerizable carbon-carbon double bond, such as vinyl monomer, vinyl ethers or acrylic monomer.

These compounds (a) can be used alone, or two or more kinds of them can be used in combination. The radiation polymerizable compound (a) can also be replaced by a mixture of a polyfunctional monomer and a monofunctional monomer for the purpose of controlling the viscosity and enhancing the adhesion and the tackiness in a semi-cured state.

Examples of the monofunctional (meth)acrylate monomer include methyl methacrylate, alkyl (meth)acrylate, isobornyl (meth)acrylate, alkoxypolyethylene glycol (meth)acrylate, phenoxydialkyl (meth)acrylate , phenoxypolyethylene glycol (meth)acrylate, alkylphenoxy polyethylene glycol (meth)acrylate, nonylphenoxy polypropylene glycol (meth) acrylate, hydroxyalkyl (meth)acrylate, glycerol acrylate methacrylate, butanediol mono(meth)acrylate, 2-hydroxy-3-phenoxypropyl acrylate, 2-acryloyloxyethyl-2-hydroxypropyl acrylate, ethylene oxide-modified phthalic acid acrylate, w-carboxycaprolactone monoacrylate, 2-acryloyloxypropylhydrogen phthalate, 2-acryloyloxyethylsuccinc acid, acrylic acid dimer, 2-acryloyloxypropylhexahydrohydrogen phthalate, fluorine-substituted alkyl (meth)acrylate, chlorine-substituted alkyl (meth)acrylate, sodium sulfonate ethoxy(meth)acrylate, sulfonic acid-2-methylpropane-2-acrylamide, phosphate ester group-containing (meth)acrylate, sulfonate ester group-containing (meth)acrylate, silano group-containing (meth)acrylate, ((di)alkyl)amino group-containing (meth)acrylate, quaternary ((di)alkyl)ammonium group-containing (meth)acrylate, (N-alkyl)acrylamide, (N,N-dialkyl)acrylamide and acryloylmorpholine.

Examples of the monofunctional maleimide monomer include N-alkyl maleimide such as N-methyl maleimide, N-ethyl maleimide, N-butyl maleimide or N-dodecyl maleimide; N-alicyclic maleimide such as N-cyclohexyl maleimide; N-benzyl maleimide; N-(substituted or non-substituted phenyl) maleimide such as N-phenyl maleimide, N-(alkylphenyl)maleimide, N-dialkoxyphenyl maleimide, N-(2-chlorophenyl)maleimide, 2,3-dichloro-N-(2,6-diethylphenyl)maleimide or 2,3-dichloro-N-(2-ethyl-6-methylphenyl)maleimide; maleimide having a halogen, such as N-benzyl-2,3-dichloro maleimide or N-(4'-fluorophenyl)-2,3-dichloro maleimide; maleimide having a hydroxyl group, such as hydroxyphenyl maleimide; maleimide having a carboxy group, such as N-(4-carboxy-3-hydroxyphenyl) maleimide; maleimide having an alkoxyl group, such as N-methoxyphenyl maleimide; maleimide having an amino group, such as N-[3-(diethylamino)propyl] maleimide; polycyclic aromatic maleimide such as N-(1-pyrenyl) maleimide; and maleimide having a heterocycle, such as N-(dimethylamino4-methyl-3-coumarinyl)maleimide or N-(4-anilino-1-napthyl)maleimide.

In the case in which an amphipathic compound (b) described hereinafter is added to the composition (x), a hydrophobic compound (a) is preferably use as the compound (a). The hydrophobic compound (a) refers to a compound whose homopolymer exhibits a contact angle with water of 60 degrees or more. The hydrophobic compound (a) can be used by selecting from the compounds listed as the compound (a) and almost all of compounds listed are hydrophobic compounds (a).

The composition (x) is irradiated with an active energy ray to form a cured resin and contains a compound (a) as an essential component. The composition (x) may contain the compound (a) alone, or may contain a mixture of plural kinds of compounds (a). If necessary, other components can be added to the composition (x). Examples of the other component, which can be added to the composition (x), include compounds, which are copolymerizable with the compound (a), active energy ray polymerization initiators, polymerization-delaying agents, polymerization inhibitors, thickeners, modifiers, colorants and solvents.

The compound, which can be added to the composition (x) and is copolymerizable with the compound (a), may be an amphipathic compound, a hydrophilic compound or a hydrophobic compound. The hydrophilic compound, which can be added to the composition (x) and is copolymerizable with the compound (a), has a hydrophilic group in the molecule and gives a hydrophilic polymer.

Examples of such a compound include vinyl pyrrolidone, N-substituted or non-substituted acrylamide, acrylic acid, polyethylene glycol group-containing (meth)acrylate, hydroxyl group-containing (meth)acrylate, amino group-containing (meth)acrylate, carboxyl group-containing (meth)acrylate, phosphoric acid group-containing (meth) acrylate, and sulfone group-containing (meth)acrylate.

The hydrophobic compound, which can be added to the composition (x) and is copolymerizable with the compound (a), has a hydrophobic group in the molecule and gives a hydrophobic polymer. Examples of such a compound include alkyl (meth)acrylate, fluorine-containing (meth) acrylate and (alkyl-substituted)siloxane group-containing (meth)acrylate.

The amphipathic compound which can be added to the composition (x) and is copolymerizable with the compound (a) (hereinafter such a compound is referred to as an "amphipathic compound (b)" or is simply referred to as a "compound (b)") is preferably a compound having one or more polymerizable carbon-carbon unsaturated bonds in a molecule. Although it is not necessary that a homopolymer of the amphipathic compound (b) be a crosslinked polymer, the amphipathic compound (b) may be a compound which can be converted into a crosslinked polymer.

The amphipathic compound (b) and the hydrophobic compound (a) dissolve uniformly in each other. In this case, "dissolve" means the fact that macroscopic phase separation does not occur and also includes the state where micelles are formed and stably dispersed.

As used herein, the amphipathic compound refers to a compound which has a hydrophilic group and a hydrophobic group in the molecule and is compatible with water and a hydrophobic solvent. Also in this case, "compatible" means the fact that macroscopic phase separation does not occur and also includes the state where micelles are formed and stably dispersed. Regarding the amphipathic compound (b), a solubility in water at 0° C. is preferably 0.5% by weight or more and a solubility in a mixed solvent of cyclohexane and toluene in a weight ratio of 5:1 at 25° C. is preferably 25% by weight or more.

As used herein, the solubility, for example, the solubility of 0.5% by weight or more means that at least 0.5% by weight of the compound can be dissolved, but not include the fact that a very small amount of the solvent can be dissolved in the compound, though 0.5% by weight of the compound is not dissolved in the solvent. When using a compound wherein either of the solubility in water or the solubility in the mixed solvent of cyclohexane and toluene in a weight ratio of 5:1 is lower than the value, it becomes difficult to satisfy both high surface hydrophilicity and water resistance.

In the case in which the amphipathic compound (b) has a nonionic hydrophilic group, particularly a hydrophilic group of polyether, balance between hydrophilicity and hydrophobic is preferably within a range from 10 to 16, and more preferably from 11 to 15, in terms of a Griffin's HLB value. When the HLB value is not within the above range, it is difficult to obtain a fabricated article having high hydrophilicity and excellent water resistance, or the combination or mixing ratio of the compound required to obtain the fabricated article is extremely limited, resulting in unstable performances of the fabricated article.

The hydrophilic group of the amphipathic compound (b) is not specifically limited and examples thereof include cation group such as amino group, quaternary ammonium group or phosphonium group; anion group such as sulfone group, phosphoric acid group or carbonyl group; nonion group, for example, polyether group such as hydroxyl group or polyethylene glycol group, or amide group; and amphoteric ion group such as amino acid group. The hydrophilic group is preferably a polyether group, and particularly preferably a polyethylene glycol chain of a repeating number of 6 to 20.

Examples of the hydrophobic group of the amphipathic compound (b) include alkyl group, alkylene group, alkylphenyl group, long chain alkoxy group, fluorine-substituted alkyl group and siloxane group. The amphipathic compound (b) preferably contains, as the hydrophobic group, an alkyl or alkylene group having 6 to 20 carbon atoms. The compound may has the alkyl or alkylene group having 6 to 20 carbon atoms in the form of alkylphenyl group, alkylphenoxy group, alkoxy group or phenylalkyl group.

The amphipathic compound (b) is preferably a compound which has a polyethylene glycol chain of a repeating number of 6 to 20 as the hydrophilic group and also has alkyl or alkylene group having 6 to 20 carbon atoms as the hydrophobic group. The amphipathic compound (b), which can be used more preferably, may be a compound represented by the general formula (1):

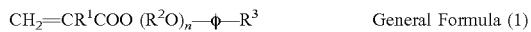

General Formula (1)

(wherein $R^1$ represents hydrogen, a halogen atom or a lower alkyl group, $R^2$ represents an alkylene group having 1 to 3 carbon atoms, n represents an integer of 6 to 20, φ represents a phenylene group, and $R^3$ represents an alkyl group having 6 to 20 carbon atoms).

More specifically, $R^3$ is a hexyl group, a heptyl group, an octyl group, a nonyl group, a decyl group, a dodecyl group or a pentadecyl group, and preferably a nonyl group or a dodecyl group. In the general formula (1), the larger the numerical value of n, the larger the number of carbon atoms of $R^3$, the better.

A relationship between the numerical value of n and the number of carbon atoms of $R^3$ is preferably within a range from 10 to 16, and particularly preferably from 11 to 15, in terms of a Griffin's HLB value. Among these amphipathic compounds (b), nonylphenoxy polyethylene glycol (n=8 to 17) (meth)acrylate and nonylphenoxy polypropylene glycol (n=8 to 17) (meth)acrylate are particularly preferred.

The active energy ray polymerization initiator, which can be added to the composition (x), is not specifically limited as long as it is active to an active energy ray used in the present invention and is capable of polymerizing the compound (a) and may be, for example, a radical polymerization initiator, an anion polymerization initiator or a cation polymerization initiator. The active energy ray polymerization initiator is particularly effective when using light rays as the active energy ray.

Examples of the photopolymerization initiator include acetophenones such as p-tert-butyltrichloroacetophenone, 2,2'-diethoxyacetophenone and 2-hydroxy-2-methyl-1-phenylpropan-1-one; ketones such as benzophenone, 4,4'-bis-dimethylaminobenzophenone, 2-chlorothioxanthone, 2-methylthioxanthone, 2-ethylthioxanthone and 2-isopropylthioxanthone; benzoin ethers such as benzoin, benzoin methyl ether, benzoin isopropyl ether and benzoin isobutyl ether; benzyl ketals such as benzyl dimethyl ketal and hydroxycyclohexyl phenyl ketone; and azide such as N-azidesulfoneylphenyl maleimide. Also, polymerizable photopolymerization initiators such as maleimide compound can be listed.

When the photopolymerization initiator is mixed with the composition (x), the amount of the non-polymerizable photopolymerization initiator is preferably within a range from 0.005 to 20% by weight, and particularly preferably from 0.1 to 5% by weight. The photopolymerization initiator may be a polymerizable compound, for example, a polyfunctional or monofunctional maleimide monomer listed as the radiation polymerizable compound (a). The amount is not limited to the amount within the above range.

The polymerization-delaying agent, which can be added to the composition (x), include, for example, vinyl monomers having a lower polymerization rate than that of the radiation polymerizabie compound (a), such as styrene, α-methylstyrene, α-phenylstyrene, p-octylstyrene, p-(4-pentylcyclohexyl)styrene, p-phenylstyrene, p-(p-ethoxyphenyl)phenylstyrene, 2,4-diphenyl-4-methyl-1-pentene, 4,4'-divinylbiphenyl and 2-vinyl naphthalene in the case in which the radiation polymerizable compound (a) is an acryloyl group-containing compound.

The polymerization inhibitor, which can be added to the composition (x), includes, for example, hydroquinone derivatives such as hydroquinone and methoxyhydroquinone; and hindered phenols such as butylhydroxytoluene, tert-butylphenol and dioctylphenol in the case in which the radiation polymerizable compound (a) is a polymerizable carbon-carbon double bond-containing compound.

When using light rays as the active energy ray, the polymerization-delaying agent and/or the polymerization inhibitor are preferably used in combination with the photopolymerization initiator in order to improve the patterning accuracy. Examples of the thickener, which can be added to the composition (x), include chain polymers such as polystyrene.

Examples of the modifier, which can be added to the composition (x), include hydrophobic compounds, that function as a water repellent and a releasant, such as silicone oil and fluorine-substituted hydrocarbon; water-soluble polymers, that function as a hydrophilizing agent and an adsorption inhibitor, such as polyvinyl pyrrolidone, polyethylene glycol and polyvinyl alcohol; and nonionic, anionic and cationic surfactants, which function as a wettability modifier, a releasant and an adsorption inhibitor. Examples of the colorant, which can be optionally mixed with the composition (x), include any dyes or pigments, fluorescent pigments and ultraviolet absorbers.

The solvent, which can be added to the composition (x), may be any solvent as long as it can dissolve the respective components of the composition (x) to yield a uniform solution, and is preferably a volatile solvent. In the case in which the composition (X) has a high viscosity or is applied in a small thickness, the solvent is preferably added to the composition (x). The solvent is volatilized and removed after coating or in any of the following steps.

According to the method of the present invention, the composition (x) is applied on a coating substrate to form an uncured coating film. This step is referred to as the "step (i)". The thickness of the coating film is not specifically limited, but is preferably 1 µm or more, more preferably 5 µm or more, and still more preferably 10 µm or more. When the thickness is less than the above range, it becomes difficult to manufacture.

The thickness of the coating film is preferably 1000 µm or less, more preferably 400 µm or less, and still more preferably 200 µm or less. When the thickness is more than the above, range, the effects of the present invention are adversely affected. The thickness of the coating film slightly varies due to shrinkage upon curing, but generally corresponds to the thickness of the layer which serves as the resin layer (X). The composition may be applied to any position, for example, the entire or partial surface of the coating substrate. Alternatively, the composition may be applied to a portion other than the portion which is laminated with a member (J) described hereinafter.

As a method of applying the composition (x) to the coating substrate, there can be employed any method capable of applying on the coating substrate, and examples thereof include a spin coating method, roller coating method, casting method, dipping method, spraying method, bar coater method, X-Y applicator method, screen printing method, letterpress printing method, guravure printing method, and extrusion or casting through a nozzle. In the case which the composition (x) is applied in a small thickness, there can also be employed a method of coating the composition (x) containing a solvent and volatilizing the solvent.

Except for the portion which should serve as a cut portion, the uncured coated composition (x) is irradiated with an active energy ray, thereby semi-curing the composition (x) at the irradiated portion and leaving the portion, that is not irradiated with the active energy ray, of the composition (x) as the uncured portion (hereinafter, this operation is occasionally referred to as "patterning exposure" or simply as "exposure"). This step is referred to as the step (ii) of forming a semi-cured coating film. An irradiation angle is not specifically limited and it is not necessary to irradiate in the direction perpendicular to the coating film surface.

As used herein, "semi-curing" means the curing degree which makes the composition (x) non-flowable or slightly flowable, and also means curing to such an extent that unreacted active energy ray polymerizable functional groups can remain which can be polymerized by further irradiation with the active energy ray. The method of semi-curing the composition (x) is preferably a method of irradiating with an active energy ray at a dose which is insufficient to completely cure the composition (x), or a method of irradiating at a temperature lower than a reirradiation temperature described hereinafter, or a combination of both methods.

When the dose of the active energy ray is too small and the curing degree is insufficient, it becomes impossible to form a cut portion having a desired shape because of insufficient selectivity upon removal of the uncured portion. Also in the case in which the member (J) has a recessed portion on the surface in the step of bonding with the member (J), the composition (x) penetrates into the recessed portion, thereby causing clogging of the recessed portion and changing a sectional area of the recessed portion. Therefore, it is not preferred.

When the dose of the active energy ray is too large and the curing degree is excessive, the flexibility of the semi-cured coating film is lost and the adhesion is lowered, thus causing insufficient bonding with the member (J). Preferred semi-curing degree can be appropriately determined by a simple test in the system to be used.

The shape of a pattern in the patterning exposure, that is, the shape, which serves as the cut portion, can be optionally determined according to the purposes. Examples thereof include a portion of a communicating passage, outlet, liquid storage chamber, reaction chamber, liquid-liquid contact portion, developing passage of chromatography or electrophoresis, detection portion, or valve structure; space used as peripheral portion of a stopper, pressure tank, vacuum tank, or pressure detection portion; and all or a portion of a cavity-shaped cut portion employed as the space which is employed as a portion in which a sensor is embedded.

In the case in which the shape, which serves as the cut portion, is a linear shape in the face of the coating film, it may be in the form of a line, zigzag, swirl, or horseshoe. When used as a liquid storage chamber or a reaction chamber, it may be of a circular or rectangular shape. The shape, which serves as the cut portion, may be a micro-through hole which communicates the surface and the back surface of the coating film. The cut portion may communicate or not communicate with the peripheral portion of the coating film, that is, peripheral portion of the microdevice.

In the case in which the cut portion has a linear shape view from the coating film surface, the cut portion, that is, the uncured portion has a width within a range from 1 to 1000 µm. The width is preferably 1 µm or more, more preferably 5 µm or more, and still more preferably 10 µm or more. It becomes impossible to manufacture a microdevice having the uncured portion having a narrower width. The width of the uncured portion is preferably 1000 µm or less, more preferably 500 µm or less, and still more preferably 200 µm or less.

When the width of the uncured portion is above the above range, the effects of the present invention are adversely affected. A ratio of the width to the depth of the groove is not specifically limited, but is preferably within a range from 0.2 to 10, and more preferably from 0.5 to 5. The size of the uncured portion formed by the exposure is not always the same as that of the portion, which is not irradiated with the active energy ray, and the size may be larger or smaller than that of the portion which is not irradiated with the active energy ray.

The size can vary depending on the kind and dose of the active energy ray, the reactivity of the compound (a), the kind and amount of the active energy ray polymerization initiator, and the amount of the polymerization inhibitor and the delaying agent. However, the size does not change too much and changes about ½ to 2 times at most. The sectional shape of the uncured portion may be in any form such as rectangle (including chamfered rectangle), trapezoid (including chamfered trapezoid) or semicircle.

Examples of the active energy ray, which can be used in the present invention, include light rays such as ultraviolet light, visible light, infrared ray, laser beam and synchrotron radiation; electromagnetic radiation such as X-rays, gamma-rays and synchrotron radiation; and particle beams such as electron beams, ion beams, beta-rays and heavy particle beams. Among these active energy rays, ultraviolet light and visible light are preferred and ultraviolet light is particularly preferred in view of handling properties and curing rate. For the purpose of increasing the curing rate and performing complete curing, the irradiation with the active energy ray is preferably performed in a low oxygen concentration atmosphere. The low oxygen concentration atmosphere is preferably nitrogen gas flow, carbon dioxide gas flow, argon gas flow, vacuum or reduced-pressure atmosphere.

The method of irradiating the portion other than the portion, which serves as the cut portion, is not specifically limited and, for example, there can be employed a photolithographic technique of irradiating while masking the portion, which requires no irradiation, or scanning beam of the active energy ray such as laser beam.

In the method of the present invention, after the completion of the exposure, the uncured composition (x) of the non-irradiated portion is removed to form a resin cut portion (hereinafter, this operation is occasionally referred to as "development"). This step is referred to as the "step (iii)". The method of removing the uncured composition (x) is not specifically limited and, for example, there can be employed methods such as blowing by compressed air, absorption by a filter paper, washing out by liquid flow of a non-solvent such as water, washing with a solvent, volatilization and decomposition.

Among these methods, washing out by liquid flow of the non-solvent or washing with the solvent is preferred. The uncured portion of the composition (x) is converted into a cut portion by the development. The shape and size of the cut portion thus formed are generally the same as those of the uncured portion of the composition (x), but do not completely correspond. For example, in the case of blowing by compressed air or washing out by liquid flow of the non-solvent, the width of the cut portion tends to be reduced as compared with washing with the solvent. Also, the uncured composition (x) of the non-irradiated portion is not completely removed and the resulting cut portion has a round bottom and the bottom of the cut portion is not contacted with the coating substrate surface, sometimes.

In the case of forming the portion, which is not bonded but is contacted with the member (J), at a portion of the resin layer (X) of the microdevice manufactured by the present invention, between the step (i) and the step (ii) and/or between the step (ii) and the step (iii) and/or between the step (iii) and the step (iv), a portion of the coating film, which serves as the resin layer (X), is selectively irradiated with an active energy ray, thereby partially curing the resin layer so that the irradiated portion is not bonded with another member in the case of laminating with the another member in the step (iv). This step is referred to as the "step (ii')".

In the case in which the step (ii') is performed between the step (i) and the step (ii), the uncured coating film, which serves as the resin layer (X), is partially cured, and the portion, which serves as the cut portion, is removed, followed by semi-curing. In the case in which it is performed between the step (ii) and the step (iii), the coating film, which serves as the resin layer (X), is partially cured in the state where the uncured portion and the semi-cured portion exist, and then the cut portion is formed.

In the case in which it is performed between the step (iii) and the step (iv), a portion of the semi-cured coating film having the cut portion formed therein is partially cured. The step (ii') and the steps (i), (ii) and (iii) may be performed at substantially the same time, or may be performed in plural stages. The active energy ray used in the step (ii') is the same as that used in the step (ii) of semi-curing the coating film.

This can also be applied to the case of forming the structure that a portion of the resin layer (X) is not bonded but is contacted with the member (K). In the case of forming the portion wherein a portion of the resin layer (X) is contacted with neither the member (J) nor the member (K), the same method can be employed.

In the case of forming the portion, which is not bonded with the member (K) but is bonded with the member (J), at a portion of the resin layer (X), the portion can be formed in the same manner as described above, except that the step of partial curing is performed between the step (iv) and the step (v), between the step (iv) and the step (vi), between the step (v) and the step (vi), between the step (vi) and the step of laminating the member (K), or between the step (v) and the step of laminating the member (K).

After the step (iii), the semi-cured coating film of the composition (x) is laminated with the member (J), thereby converting the semi-cured coating film into a resin layer (X). This step is referred to as the "step (iv)". Lamination of the semi-cured coating film of the composition (x) with the member (J) may be in the form according to the applications and purposes and may not be performed over the entire surface.

The shape of the member (J) is not specifically limited and can be any shape according to the applications and purposes. For example, the member can be in the form of a sheet (including film and ribbon), plate, coating film, bar, tube, or molded article having a complicated shape. In view of ease of molding and ease of lamination and bonding of the composition (x) and the semi-cured coating film, the surface to be bonded is preferably in the form of a plane or secondary curved surface, and particularly preferably a sheet or a plate. The member (J') described hereinafter has a specific shape in the member (J).

The material of the member (J) is not specifically limited as long as it can be bonded with the composition (x). Examples of the material, which can be used as the member (J), include polymer, glass, crystal such as quartz, ceramic, semiconductor such as silicon, and metal. Among these materials, a polymer is particularly preferred in view of the ease of molding, high productivity, and low cost.

The member (J) may be formed on a substrate. The material of the substrate is not specifically limited, and may be, for example, polymer, glass, ceramic, metal or semiconductor. Also, the shape of the substrate is not specifically limited and may be, for example, a plate-shaped article, sheet-shaped article, coating film, bar-shaped article, paper, cloth, nonwoven fabric, porous material, or injection-molded article. The substrate may be integrated with this microdevice, or may be removed after formation. Plural microdevices can be formed on one member (J), and, after the manufacture, plural microdevices can be obtained by cutting.

The polymer used as the member (J) may be a homopolymer or a copolymer, or may be a thermoplastic polymer or a thermosetting polymer. In view of the productivity, the polymer used as the member (J) is preferably a thermoplastic polymer or active energy ray curable polymer.

Examples of the polymer, which can be used as the member (J), include styrene polymers such as polystyrene, poly-α-methylstyrene, polystyrene/maleic acid copolymer and polystyrene/acrylonitrile copolymer; polysulfone polymers such as polysulfone and polyether sulfone; (meth) acrylic polymers such as polymethyl methacrylate and polyacrylonitrile; polymaleimide polymers; polycarbonate polymers such as bisphenol A polycarbonate, bisphenol F polycarbonate and bisphenol Z polycarbonate; polyolefin polymers such as polyethylene, polypropylene and poly-4-methylpentene-1; chlorine-containing polymers such as vinyl chloride and vinylidene chloride; cellulose polymers such as cellulose acetate and methylcellulose; polyurethane polymers; polyamide polymers; polyimide polymers; polyether or polythioether polymers, such as poly-2,6-dimethylphenylene oxide and polyphenylene sulfide; polyether ketone polymers such as polyether ether ketone; polyester polymers such as polyethylene terephthalate and polyarylate; epoxy resins; urea resins; phenol resins; fluorine polymers such as polyethylene tetrafluoride and PFA (copolymer of ethylene tetrafluoride and perfluoroalkoxyethylene), and silicone polymers such as polydimethylsiloxane; and cured articles of the active energy ray curable composition (x) used in the present invention.

Among these polymers, styrene polymers, (meth)acrylic polymers, polycarbonate polymers, polysulfone polymers and polyester polymers are preferred in view of good adhesion. The member (J) is preferably made of the cured article of the active energy ray curable resin. The member (J) may be composed of a polymer blend or a polymer alloy, or may be composed of a laminate or the other composite. The member (J) may contain additives such as modifiers, colorants, fillers and reinforcers.

Examples of the modifier, which can be mixed with the member (J), include hydrophobizing agents (water repellents) such as silicone oil or fluorine-substituted hydrocarbon; hydrophilizing agents such as water-soluble polymer, surfactant, inorganic powders (e.g. silica gel); and plasticizers such as dioctyl phthalate. Examples of the colorant, which can be mixed with the member (J), include any dyes or pigments, fluorescent dyes or pigments, and ultraviolet absorbers. Examples of the reinforcer, which can be mixed with the member (J), include inorganic powders such as clay; and inorganic and organic fibers or fabrics.

In the case in which the member (J) is made of a material having poor adhesion such as polyolefin, fluorine polymer, polyphenylene sulfide or polyether ether ketone, the adhesion is preferably imparted or improved by a surface treatment of the surface of the member (J) to be bonded or the use of a primer. It is preferred to use a member (J) obtained by applying an active energy ray curable composition to form a coating film and irradiating with an active energy ray to form a semi-cured coating layer in order to improve the adhesion with the resin layer (X). In view of the adhesion, it is more preferred to use the same active energy ray curable composition as that in the resin layer (X) to be bonded.

Upon use of the microdevice of the present invention, the surface of the member (J) is preferably hydrophilized for the purpose of the suppressing adsorption of a solute such as protein onto the surface of the device, in addition to an improvement in adhesion.

The member (J) may be a member having a recessed portion such as groove on the surface, a member having no recessed portion on the surface, a composition (x) (semi)-cured resin layer having no cut portion in the layer, or a separation membrane, or a composite thereof. Alternatively, the member (J) can be removed after laminating the resin layer (X) thereon. Furthermore, the member (J) can be a member wherein a single resin layer (X), a laminated plural resin layers (X) or a resin layer (X) is laminated on another member. The single resin layer (X) can be formed by the same method of removing the coating substrate in the step (v) of the present invention.

The resin layer (X) is transferred onto the member (J) by removing the coating substrate from the resin layer (X) bonded with the member (J). This step is referred to as the "step (v)". The removing method is not specifically limited and can be peeling, dissolution, decomposition, meltingl, or volatilization. In view of high productivity, peeling is preferred. Also, dissolution is preferred because a flexible thin resin layer (X) can be formed without causing breakage.

In the case in which the coating substrate is removed by peeling, the step (vi) described hereinafter is preferably provided before the step (v). Alternatively, it is provided before and after the step. The removal by peeling is not specifically limited and may be peeling by stretching, peeling using a knife, peeling by liquid flow such as water flow, peeling by air flow such as compressed air, or natural peeling by dipping in water. It is also preferred to change temperature conditions or to remove in water so as to facilitate peeling.

The peeling is facilitated by selecting a combination of the material of the coating substrate and the composition (x) and selecting a composition wherein it exhibits the adhesion in the state of the uncured coating film and the semi-cured coating film and the bonding strength is lowered after curing. The method of removing by peeling is a preferred method in the case in which the resin layer (X) has comparatively high rigidity, that is, it has a tensile modulus within a range from 0.1 to 10 GPa.

In the case in which the coating substrate is removed by dissolution, the step (vi) described hereinafter may be provided before or after this step (v). As a matter of course, it may be provided before and after this step. The removal by dissolution can be performed by selecting a combination of the material of the coating substrate and the composition (x), using a solvent capable of selectively dissolving the coating substrate. Examples of the solvent include water, acid, alkali, lower alcohol, ketone solvent, ester solvent, ether solvent, and hydrocarbon. Also, the dissolution method is not specifically limited and, for example, there can be employed methods such as dipping in a liquid, shower, and washing with steam.

These methods do not require that the coating substrate be completely dissolved. If a portion of the coating substrate is swollen and dissolved, and then the coating substrate is peeled from the resin layer (X), the object of the present invention can be sufficiently attained. Therefore, there is also included a method wherein a portion of the coating substrate is swollen and dissolved by strongly spraying a solvent, capable of dissolving the coating substrate, such as water, and then the coating substrate is peeled from the resin layer (X).

Among these methods, the method of dissolving with water, acid or alkali is preferred. The removal by dissolution is preferred in the case in which the step (vi) described hereinafter is provided before this step (v) and the removal is hardly performed by peeling like the case where the cut portion of the resin layer (X) is in the form of continuous line, curve, or numerous lines. The method of removing by dissolution is a preferred method in the case in which the cured resin layer (X) has relatively low rigidity, that is, it has a tensile modulus within a range from 1 to 700 MPa. The removal by dissolution is performed by any method such as oxidative decomposition or hydrolysis, and can be handled in the same manner as in the case of the removal by dissolution.

Before and/after the step (v), that is, in the state where the coating substrate is laminated and/or removed, the semi-cured resin layer (X) was irradiated again with an active energy ray, thereby further curing the composition (x) and bonding with the member (J). This step is referred to the "step (vi)". The irradiation with the active energy ray in this step means that the composition (x) layer is cured to such an extent as to impart a sufficient strength to the microdevice manufactured and to bond the cured article layer of the composition (x) with the member (J) at a sufficient strength.

In the case of the removal of the coating substrate in the step (v) is performed by peeling, it means curing to such an extent as to peel. Therefore, it is not necessary to cure until polymerizable groups completely disappear. In particular, in the case in which another member is laminated and bonded with the resin layer (X), the curing is preferably performed to such an extent that polymerizable groups remain, thereby bonding with the another member after a third irradiation with the active energy ray, while curing to such an extent as to peel the coating substrate.

As the active energy ray, which can be used to cure in the step (vi), there can be used those listed as active energy rays which can be used to semi-cure the composition (x). The active energy ray used in this step may be the same as or different from that used in the step (ii). Also, the irradiation conditions such as intensity, irradiation temperature, and atmospheric oxygen concentration may vary.

The resin layer (X) has a resin cut portion formed by patterning exposure and development therein, and the cut portion can constitute a cavity used as the passage by laminating the layer with the member (J) and optionally laminating another member (K) on the resin layer (X), thereby interposing the resin layer (X) between the member (J) and the another member (K). The cavity may communicate or not communicate with the exterior of the microdevice. The resin layer (X') described hereinafter has a specific shape in the resin layer (X).

After laminating the resin layer (X) on the member (J), plural resin layers (X) can be laminated by using the member (J) laminated with the resin layer (X) in place of the member (J) in the step (iv) and repeating the step of forming the resin layer (X), that is, a series of the steps (i), (ii), (iii), (iv) and (v), or a series of the steps (i), (ii), (iii), (iv), (v) and (vi), or a series of the steps (i), (ii), (iii), (iv), (vi) and (v).

At this time, it is not necessary to perform the step (vi), but is sometimes required to perform this step according to the method of peeling the substrate. The shape of the resin layer (X) of continuous two resin layers (X) may be the same or different, and the thickness and the kind of the composition (x) constituting the layer (X) may be different. In the case of repeating twice or more, a series of the steps selected from the above steps can be performed.

In the method of the present invention, preferred procedure varies depending on the method of removing the coating substrate in the step (v). For example, in the case in which the coating substrate is removed by dissolution, the semi-cured resin layer (X) is laminated with another member (K), thereby interposing the resin layer (X) between the member (J) and the another member (K), and then the irradiation with active energy ray in the step (vi) is performed in this state, thereby bonding them, preferably.

In the case in which the coating substrate is removed by dissolution, plural resin layers (X) are laminated by using the resin layer (X) in a semi-cured state after removing the coating substrate in place of the member (J) and repeating a series of any steps described above, and then the irradiation with active energy ray in the step (vi) is performed in this state, thereby bonding them.

In the case in which the coating substrate is removed by peeling, it is made possible to manufacture a microdevice, wherein the resin layer (X) is laminated with plural layers, by performing the step (vi) before the step (v), using the cured resin layer (X) formed on the member (J) after removing the coating substrate in place of the member (J) and repeating the steps (i), (ii), (iii), (iv), (vi) and (v).

It is made possible to manufacture a microdevice having plural resin layers (X) by laminating another resin layer (X) on the resin layer (X) via another member in the same manner as described above, or forming a member wherein the resin layer (X) is formed on the member (J) and laminating plural members.

Connection of the cut portions of continuous three or more members enables cavity-shaped passages to intersect three-dimensionally and also enables the microdevice to be provided with a complicated function. Such a form can be a member (J)-resin layer (X)-member (K) laminate using a member (J) selected from a member having a cut portion piercing through the member, a member having a recessed cut portion on the surface and a member having a cut portion piercing through the member and a recessed cut portion on the surface, and a member (K) having the same structure as that of the member (J). At this time, the member (K) is made of the same material as that of the resin layer (X) and has the same structure as that of the resin layer (X), and the resin layer (X) may be plural layers, and also the member (J) is made of the same material as that of the resin layer (X) and has the same structure as that of the resin layer (X).

It is also preferred to closely contact the another member (K) with the surface of the resin layer (X) thus formed. The close adhesion can be bonding, adhesion or non-bonded close adhesion, but is preferably bonding. The bonding method is not specifically limited, but is preferably a method of using an active energy ray curable composition as the material of the member (K), bringing the composition into contact with the resin layer (X) in a semi-cured state, and irradiating again with an active energy ray thereby bonding them. It is also preferred to form in the same manner as in the case of the resin layer (X), except that no cut portion is formed. The member (K') described hereinafter has a specific shape of the member (K).

The shape and the size of the member (K) are the same as those of the member (J). The member (K) can be a member having a cut portion piercing through the member, a member having a recessed cut portion such as groove on the surface, a member having neither a cut portion piercing through the member nor a recessed cut portion on the surface, a resin layer, which is made of the same material as that of the resin layer (X) and has the same structure as that of the resin layer (X), formed by the same manner as in the case of the resin layer (X), a (semi)-cured resin layer of a composition (x) having no cut portion in the layer, or a separation membrane, or a composite thereof. The member wherein the resin layer (X) is laminated on any member can be used in place of the member (K).

The hardness of the resin layer (X) can be controlled to the desired hardness by selecting the radiation polymerizable compound (a) and the respective components of the composition (x). The tensile elasticity of the resin layer (X) can be controlled within a range from 0.01 to 10 GPa, and preferably from 0.05 to 3 GPa.

The microdevice of the present invention can be replaced by a microdevice having a valve by providing the resin layer (X) with a structure which serves as a stopper. The structure, which serves as the stopper, is preferably in the form of a sheet, a portion of which is fixed, in view of ease of the manufacture. The sheet, a portion of which is fixed, can be a tongue, circle or rectangle, which is fixed at one or more portions.

According to the method of the present invention, it is made possible to form a sheet-shaped stopper, a portion of which is fixed, by subjecting the peripheral portion of the portion, which serves as the stopper, to exposure in the shape, which serves as the cut portion, in the step (ii) of the present invention. In order to form a structure, which serves as a tongue-shaped stopper, the exposure is performed so as to form a horseshoe-shaped cut portion.

Then, a valve can be formed by laminating a member (J), a member (K) or a resin layer (X), having an orifice-shaped cut portion having a smaller area than that of the stopper, on one side of the resin layer (X) having the stoppre formed thereon while aligning the orifice-shaped cut portion with the stopper, and laminating a member (J), a member (K) or a resin layer (X), having a cut portion, which serves as a cavity larger than the stopper, on the other side of the resin layer (X) so that the stopper can move.

In the case of bonding the resin layer (X) with another member or the resin layer, for example, the member (J), the member (K) or the resin layer (X), having an orifice-shaped cut portion having a smaller area than that of the stopper, the portion, which serves as the stopper of the resin layer (X), is preferably irradiated with an active energy ray, thereby accelerating curing without bonding of the portion before the step (iv) in order to avoid bonding of the stopper portion. The irradiation with the active energy ray is preferably performed on the step (ii) and/or between the step (iii) and the step (iv).

The resin layer (X) to be provided with the stopper is preferably formed of a flexible material and is preferably formed of a material having a lower tensile elasticity than that of the layers or members, between which the layer is interposed. The tensile elasticity of the material used in the resin layer (X) to be provided with the stopper is preferably within a range from 1 MPa to 1 GPa, more preferably from 10 to 500 MPa, and still more preferably from 50 to 300 MPa. When the tensile elasticity is less than the above range, the resulting resin layer is likely to be inferior in strength and repeating durability. On the other hand, when the tensile elasticity is more than the above range, leakage is likely to occur upon closure.

According to the manufacturing method of the present invention, in the case of manufacturing a microdevice having a movable diaphragm similar to the case of manufacturing a microdevice having a stopper, it is preferred to provide the step of irradiating the portion, which should not be bonded with the resin layer (X), with an active energy ray, thereby accelerating curing without bonding the portion between the step (i) and the step (iv) when the resin layer (X) is adjacent to the diaphragm in order to prevent bonding of the diaphragm with adjacent member, that is, the resin layer (X), the member (J) or the member (K).

Examples of the microdevice, which can be manufactured by such a method, include microdevices having a diaphragm valve mechanism, a check valve mechanism, a diaphragm type on-off valve mechanism or a diaphragm type flow rate control valve mechanism.

The microdevice thus manufactured can also be subjected to postworking such as perforation or cutting. Since the microdevice of the present invention is small as a whole, simultaneous manufacture of numerous members in a single resin layer is useful for manufacturing efficiency and positioning of details of the respective members with good accuracy. That is, numerous microdevices having high-accuracy dimensional stability can be manufactured at a time with good reproducibility by manufacturing plural microdevices on one exposure/development plate.

The microdevice of the present invention is a microdevice having a laminated structure comprising a member (J') (selected from a member having a cut portion piercing through the member, a member having a recessed cut portion on the surface, and a member having a cut portion piercing through the member and a recessed cut portion on the surface}, one or more active energy ray curable resin layers (X') having a cut portion at a portion of the layer, the cut portion having a minimum width within a range from 1 to 1000 μm, and a member (K') {selected from a member having a cut portion piercing through the member, a member having a recessed cut portion on the surface, and a member having a cut portion piercing through the member and a recessed cut portion on the surface}, which are laminated, while two or more cut portions in the members are connected to form a cavity.

The member (J') is the same as the member (J) used in the method of the present invention, except that it is a member having a cut portion piercing through the member, a member having a recessed cut portion such as groove on the surface, or a member having a cut portion piercing through the member and a recessed cut portion on the surface, and also has a specific shape of the member (J). Also, the member (K') is the same as the member (K) used in the method of the present invention, except that it is a member having a cut portion piercing through the member, a member having a recessed cut portion such as groove on the surface, or a member having a cut portion piercing through the member and a recessed cut portion on the surface, and also has a specific shape of the member (K).

The position, the shape, and the size of the cut portion piercing through the member are not specifically limited as long as the cut portion is open to the face which can be connected with the resin layer (X'). The cut portion piercing through the member can be a cut portion having a complex shape such as circular orifice, rectangular orifice, slit, cone, pyramid, barrel, or threaded orifice. The cut portion of the member (J') can be in the form of an orifice larger than that of the resin layer (X') and the size and shape of the recessed cut portion formed on the member (J') surface is the same as those of the cavity formed in the microdevice of the present invention described hereinafter.

The method of manufacturing the member (j') and the member (K'), which have the cut portion, is not specifically limited and they can be manufactured, for example, by an injection molding method, a melt replica method, a solution casting method, a photolithograph method using an active energy ray curable composition, or a cast molding method using an active energy ray curable composition. The member (J') can be a resin layer, which is made of the same material as that of the resin layer (X') in the present invention and has the same shape as that of the resin layer (X'), and the resin layer (X') in the present invention can be a multi-layered structure or a laminate wherein the resin layer (X') in the present invention is laminated with another member.

The microdevice of the present invention is a laminate of a member (J'), one or more resin layers (X') and a member (K') and the total number of the layers is 3 or more, preferably within a range from 3 to 10, and more preferably from 3 to 6, although this varies depending on the applications and purposes.

In the microdevice of the present invention, unlike the resin layer (X) in the method of the present invention, the cut portion formed on the resin layer (X') pieces through the resin layer and the resin layer is laminated with another resin layer (X') or the member having a through hole and a recessed portion to form a cavity which communicates with these layers and the member. The resin layer (X') is the same as the resin layer (X) in the method of the present invention, except that the cut portion formed on the resin layer pierces through the resin layer.

In the microdevice of the present invention, among the respective cut portions formed in the member (J'), one or more resin layers (X') and the member (K'), the cut portions of at least two adjacent layers communicate with each other to form a cavity. Preferably, the cut portions of continuous three or more layers communicate with each other to form a cavity.

It is also possible to further laminate another member, for example, a member having a cut portion with the microdevice of the present invention. Also, two or more microdevices of the present invention can be bonded so that cavities open to the surface are communicated with each other to manufacture a new microdevice. Alternatively, they can be laminated and bonded while interposing a member having neither a through hole nor recessed portion to manufacture a microdevice composed of plural portions wherein cavities are not communicated with each other.

Examples thereof include a microdevice having a diaphragm structure such as diaphragm type pump mechanism or diaphragm valve mechanism, wherein a member having neither a through hole nor a recessed portion forms a diaphragm. The member having neither a through hole nor a recessed portion is preferably formed of an active energy ray curable resin because of high interlaminar adhesion and high productivity. Such a member can be a porous membrane, a dialysis membrane or a gas separation membrane.

The shape of the cavity in the microdevice of the present invention can be optionally determined according to the applications and purposes. Examples thereof include a portion of communicating passage, outlet, liquid storage chamber, reaction chamber, liquid-liquid contact portion, developing passage of chromatography or electrophoresis, detection portion, or valve structure; space used as peripheral portion of valve, pressure tank, vacuum tank, or pressure detection portion; and all or a portion of a cavity-shaped cut portion employed as the space which is employed as a portion in which a sensor is embedded.

Preferably, plural passages or branched passages formed in different resin layers (x') intersect three-dimensionally across the resin layer (X') because a complicated device can be manufactured as a result of release from such a restriction that passages must be formed in the plane.

In the present invention, the cavity can constitute a portion of the valve. The kind of valve is not specifically limited and examples thereof include a check valve (valve which is normally closed and is opened when a predetermined or greater pressure is applied), non-return valve (valve which is normally open in a certain direction and is closed in the reverse direction), on-off valve, flow rate control valve and so on.

In the case the valve has a stopper, the shape of the stopper is not specifically limited and can be in the form of sheet (including film, membrane, ribbon and plate), a portion of which is fixed, such as tongue; and independent bulk such as sphere, cone, and plate contained in the cavity. The structure, which serves as the stopper, is preferably in the form of a sheet, a portion of which is fixed, because of ease of manufacture.

The sheet, a portion of which is fixed, can be a tongue, circle, or rectangle, which is fixed at one or more portions. According to the method of the present invention, it is made possible to form a sheet-shaped stopper, a portion of which is fixed, having the peripheral portion of the portion, which serves as the stopper, as a cut portion at a portion of the resin layer (X').

A structure, which serves as a tongue-shaped stopper, can be obtained when the cut portion is in the form of a horseshoe. An orifice-shaped cut portion having a smaller area than that of the stopper is laminated on one side of the resin layer (X') having the stopper formed thereon while aligning the orifice-shaped cut portion with the stopper, and a cavity larger than the stopper is formed on the other side of the resin layer so that the stopper can move, thus making it possible to function as a valve.

The resin layer (X') having the stopper is preferably formed of a flexible material and is preferably formed of a material having a lower tensile elasticity than that of the layers or members, between which the resin layer is interposed. The tensile elasticity of the material used in the resin layer (X') having the stopper is preferably within a range from 1 MPa to 1 GPa, more preferably from 10 to 500 MPa, and still more preferably from 50 to 300 MPa. When the tensile elasticity is less than the above range, the resulting resin layer is likely to be inferior in strength and repeating durability. On the other hand, when the tensile elasticity is more than the above range, leakage is likely to occur upon closure.

Also, the present invention provides a microdevice having a diaphragm type valve mechanism. A preferred first embodiment of the diaphragm valve mechanism has a configuration such that the resin layer (X') is directly laminated with a member, which serves as a diaphragm, at one surface and is directly laminated with another member having a cut portion at the other surface, and the cut portions of the resin layer (X') form a cavity by lamination, while the another member laminated on the back surface of the resin layer (X'), which serves as the diaphragm, has an orifice-shaped cut portions, which serve as an inlet and/or an outlet to the cavity, at least one of the inlet and the outlet being formed across the resin layer (X') from the diaphragm, and the peripheral portion does not contact with the diaphragm and the passage can be closed by deforming the diaphragm to contact with the peripheral portion of at least one of the inlet and the outlet.

In the case in which the orifice-shaped cut portion formed at a predetermined position of the another member is either an inlet or an outlet, the other one can be a capillary passage composed of a linear cut portion formed on the resin layer (X') and a resin layer, which serves as a diaphragm, or a capillary passage composed of a groove-shaped cut portion formed on the another member and the resin layer (X').

Examples of the valve having such a structure include a diaphragm valve which is normally open. The structure wherein the resin layer, which serves as a diaphragm, the resin layer (X') and another member are bonded and laminated can be manufactured by the method of the present invention.

The present invention also provides a microdevice having a laminated structure wherein a member (J') {selected from a member having a cut portion piercing through the member, a member having a recessed cut portion on the surface, and a member having a cut portion piercing through the member and a recessed cut portion on the surface}, one or more active energy ray curable resin layers (X') having a cut portion at a portion of the layer, the cut portion having a minimum width within a range from 1 to 1000 μm, and a member (K") having no cut portion, which serves as a diaphragm, are laminated and the member (K") has a portion, which is not bonded but is contacted with another member laminated adjacent thereto, the portion being a diaphragm portion, while two or more cut portions in the member (J') and the resin layer (X') are connected to form a cavity.

That is, the present invention provides a microdevice comprising a laminate of a member (J'), one or more resin layers (X') and a member (K") having no cut portion, wherein the member (K") has a portion, which is not bonded but is contacted with another member laminated adjacent thereto and the portion is a diaphragm portion.

The member (J') and the resin layer (X') are the same as the member (J') and the resin layer (X') described above, and the microdevice is the same as the microdevice comprising the member (J'), the resin layer (X') and the member (K'), except that the member (K") having no cut portion, which serves as the diaphragm, is used in place of the member (K').

The member (K") has a portion, which is not bonded but is contacted with another member laminated with the member, and the portion serves as the diaphragm portion. That is, when the diaphragm is deformed, the non-bonded portion can be converted into a cavity.

A preferred second embodiment of the diaphragm valve mechanism of the present invention is characterized in that it has the above structure and, moreover, the resin layer (X') has orifice-shaped cut portions, which serve as an inlet and/or an outlet, to the portion which can form the cavity, at least one of the inlet and the outlet being formed across the member from the diaphragm, and the peripheral portion does not contact with the diaphragm and the passage can be opened by deforming the diaphragm to contact with the peripheral portion of at least one of the inlet and the outlet.

In the case in which the orifice-shaped cut portion formed at a predetermined position of the resin layer (X') is either an inlet or an outlet, the other one can be formed as a connection port to the portion, which forms a cavity, of a passage composed of a linear cut portion of the resin layer (X') and a diaphragm.

The member (J') can be provided with a cut portion, which serves as a passage connected to an inlet and/or an outlet. The structure wherein the member (J'), the resin layer (X') and the member (K") are bonded and laminated can be manufactured by the method of the present invention. Examples of the valve having such a structure include diaphragm valve and check valve which are normally closed.

In the above first and second embodiments, the thickness of the diaphragm is preferably within a range from 1 to 500 μm, and more preferably from 5 to 200 μm. An optimum value of the thickness of the diaphragm varies depending on the size of the cavity portion. As the area of the cavity becomes smaller, the thickness is preferably reduced. However, when the thickness is less than the above range, it becomes difficult to manufacture the diaphragm. On the other hand, when the thickness exceeds the above range, merits as a microdevice are reduced.

The diaphragm is preferably formed of a material having a tensile elasticity within a range from 1 to 700 MPa, and more preferably from 10 to 300 MPa. Although it varies depending on the diameter of the diaphragm and the hardness of the material, when the tensile elasticity is less than the above range, it becomes difficult to manufacture the diaphragm. On the other hand, when the tensile elasticity exceeds the above range, it becomes difficult to perform opening and closing.

The material constituting the diaphragm preferably has a breaking elongation as measured by the method defined in Japanese Industrial Standard (JIS) K-7127 of 2% or more, and more preferably 5% or more. Although there is not an upper limit of the breaking elongation, as a matter of course, it is not necessary to set the upper limit because high breaking elongation does not exert an adverse influence and, for example, the breaking elongation may be 400%. In the present invention, even when using a material, which exhibits a low breaking elongation within a range from 2 to 5% in a tensile test in accordance with JIS K-7127, it is less likely to be broken in the operation of the method of the present invention. The material can be used without being broken even if strain of more than the breaking elongation in the above test is applied.

The method of deforming the diaphragm may be any method and examples thereof include pressure injection of fluid into a cavity formed on the opposite side of the diaphragm, change in pressure such as reduced pressure, mechanical compression or suction and the like.

The present invention can provide a microdevice having a multi-layered structure comprising plural layers, particularly three or more layers having a cavity, a portion of which is used as a passage. Also, the present invention can provide a microdevice having a valve structure, which is capable of easily forming a fine stopper and a thin flexible diaphragm and bonding them to the desired position. Furthermore, it is made possible to obtain a device which causes neither clogging of a passage due to an adhesive nor leakage of liquid from the space between the respective layers or the space between the layer and another member. Furthermore, a chemical device, which causes neither adsorption nor loss of a biological component and exhibits excellent reproducibility, can be obtained by using an amphipathic polymerizable compound. Consequently, it is made possible to provide a microdevice which can perform complicated reaction and analysis processes.

EXAMPLES

The present invention will now be described in detail by way of Examples and Comparative Examples, but the present invention is not limited to these Examples. In the following Examples, "parts" and "percentages" are by weight unless otherwise specified.

Irradiation with Active Energy Ray

Using a light source unit for exposure apparatus, Model Multi-Light 200, manufactured by USHIO INC. comprising a 200 W metal halide lamp as a light source, irradiation with ultraviolet light having an ultraviolet intensity of 100 mW/cm$^2$ at 365 nm was performed in a nitrogen atmosphere at room temperature.

Preparation of Composition (x)

Preparation of Composition (x-1)

30 Parts of a trifunctional urethane acrylate oligomer ("UNIDIC V-4263", manufactured by Dainippon Ink and Chemicals, Inc.) having an average molecular weight of about 2000 and 45 parts of 1,6-hexanediol diacrylate ("KAYARAD HDDA", manufactured by Nippon Kayaku Co., Ltd. as a radiation polymerizable compound (a), 25 parts of nonylphenoxy polyethylene glycol (n=17) acrylate ("N-177E", manufactured by DAI-ICHI KOGYO SEIYAKU CO., LTD.) as an amphipathic compound (b), 5 parts of 1-hydroxycyclohexyl phenyl ketone ("IRGACURE 184", manufactured by Ciba Geigy Co.) as a photopolymerization initiator and 0.1 parts of 2,4-diphenyl-4-methyl-1-pentene (manufactured by KANTO KAGAKU CO., LTD.) as a polymerization-delaying agent were mixed to prepare an active energy ray curable composition (x-1). An ultraviolet cured article of the active energy ray curable composition (x-1) had a tensile elasticity of 560 MPa and a contact angle with water of 12 degrees.

Preparation of Composition (x-1')

A composition (x-1') having the same composition as that of the composition (x-1) was prepared, except that it contains 2 parts of the photopolymerization initiator and does not contain the polymerization-delaying agent. An ultraviolet cured article of the active energy ray curable composition (x-1') had a tensile elasticity of 580 MPa and a contact angle with water of 12 degrees.

Preparation of Composition (x-2)

75 Parts of a polytetramethylene glycol (average molecular weight: 250) maleimide capriate (synthesized by the method described in Synthesis Example 13 of Japanese Unexamined Patent Application, First Publication (Kokai) No. 11-124403) as a radiation polymerizable compound (a), 25 parts of nonylphenoxy polyethylene glycol (n=17) acrylate ("N-177E", manufactured by DAI-ICHI KOGYO SEIYAKU CO., LTD.) as an amphipathic compound (b) and 0.01 parts of 2,4-diphenyl-4-methyl-1-pentene (manufactured by KANTO KAGAKU CO., LTD.) as a polymerization-delaying agent were mixed to prepare an active energy ray curable composition (x-2). An ultraviolet cured article of the active energy ray curable composition (x-2) had a tensile elasticity of 610 MPa and a contact angle with water of 19 degrees.

Preparation of Composition (x-2')

A composition (x-2') having the same composition as that of the composition (x-2) was prepared, except that it did not contain the polymerization-delaying agent. An ultraviolet cured article of the active energy ray curable composition (x-2') had a tensile elasticity of 630 MPa and a contact angle with water of 19 degrees.

Preparation of Composition (x-3)

30 Parts of a trifunctional urethane acrylate oligomer ("UNIDIC V-4263", manufactured by Dainippon Ink and Chemicals, Inc.) having an average molecular weight of about 2000, 45 parts of an alkyl diacrylate ("SARTOMER C2000", manufactured by SOMAR CORP.) containing ω-tetradecanediol diacrylate and ω-pentadecanediol diacrylate as a main component and 25 parts of a nonylphenoxy polyethylene glycol (n=17) acrylate ("N-177E", manufactured by DAI-ICHI KOGYO SEIYAKU CO., LTD. as a radiation polymerizable compound (a), 5 parts of 1-hydroxycyclohexyl phenyl ketone ("IRGACURE 184", manufactured by Ciba Geigy Co.) as a photopolymerization initiator and 0.1 parts of 2,4-diphenyl-4-methyl-1-pentene (manufactured by KANTO KAGAKU CO., LTD.) as a polymerization-delaying agent were mixed to prepare an active energy ray curable composition (x-3). An ultraviolet cured article of the active energy ray curable composition (x-3) had a tensile elasticity of 160 MPa and a contact angle with water of 14 degrees.

Example 1

In this Example, a method of producing a microdevice of the present invention using an acrylic resin as the composition (x) by a method of peeling a coating substrate will be described.

Step (i)

As a coating substrate (1), a 30 µm thick biaxially stretched polypropylene film (OPP film, manufactured by Futamura Chemical Industries Co., Ltd.), one surface of which is subjected to a corona discharge treatment was used after cutting into a size of 5 cm×5 cm. On the surface subjected to the corona treatment, the composition (x-1) was applied using a 127 µm thick bar coater to form a coating film (2).

Step (ii)

In a nitrogen atmosphere, a portion other than a non-exposure portion (3) shown in FIG. 1 was irradiated with ultraviolet light via a photomask having a width of a non-exposure portion of 100 µm and a length of a non-exposure portion of 30 mm for one second, thereby semi-curing the portion.

Step (iii)

While exposing the semi-cured coating film to running water from a tap, the uncured composition (x-1) at the non-exposure portion (3) was washed and removed to form a semi-cured coating film (2) having a cut portion (3) on the coating substrate (1).

Manufacture of Member (J-1)

In the same manner as in the case of forming the semi-cured coating film (2), except that a plate-shaped base material (4) having dimensions of 5 cm×5 cm×3 mm (thickness) made of polystyrene ("DICSTYRENE XC-520", manufactured by Dainippon Ink and Chemicals, Inc.) was used in place of the coating substrate (1) and a composition (x-1') was used in place of the composition (x-1) and, furthermore, the photomask was not used during the exposure, a member (J-1), wherein a semi-cured coating film (5) made of the composition (x-1') is formed on the surface of the base material (4), was manufactured.

Step (iv)

On the surface of the member (J-1) on which the semi-cured coating film (5) was formed, the semi-cured coating film (2) formed on the coating substrate (1) was laminated to obtain a resin layer (X-1) precursor (2') in a semi-cured state.

Step (vi)

The resulting laminate was irradiated with the same ultraviolet light as that used in the exposure without using the photomask for 5 minutes, thereby further curing the resin layer (X-1) precursor (2') to form a resin layer (X-1) (2') and bonding with the resin layer (5) of the member (J-1).

Step (v)

Then, the coating substrate (1) was peeled off from the four-layered laminate to manufacture a microdevice (D-1) wherein the resin layer (X-1) (2'), that is, a layer of a cured article made of the composition (x-1), which has the cut portion (3), is bonded on the resin layer (5) of the member (J-1).

Bonding of Member (K-1)

In the same manner as in the case of the member (J-1), except that a plate having dimensions of 5 cm×5 cm×3 mm (thickness) made of polystyrene(("DICSTYRENE XC-520", manufactured by Dainippon Ink and Chemicals, Inc.) was used as a member (K-1) (6) in place of the base material, a semi-cured coating film (7) made of the composition (x-1') was formed as a bonding resin layer on the member (K-1) (6) and then closely contacted with the surface of the resin layer (X-1) (2').

Step (vi)

While maintaining the state, irradiation with the same ultraviolet light as that used in the exposure was performed without using the photomask for 30 seconds, thereby curing the semi-cured coating film (7) to form a resin layer (7) and bonding the member (K-1) (6) and the resin layer (7) with the surface of the resin layer (X-1) (2) to turn the cut portion (3) of the resin layer (X-1) (2) into cavity (3'), and thus entire active energy ray curable composition (x) was completely cured.

Formation of Other Structures

Figure 2:
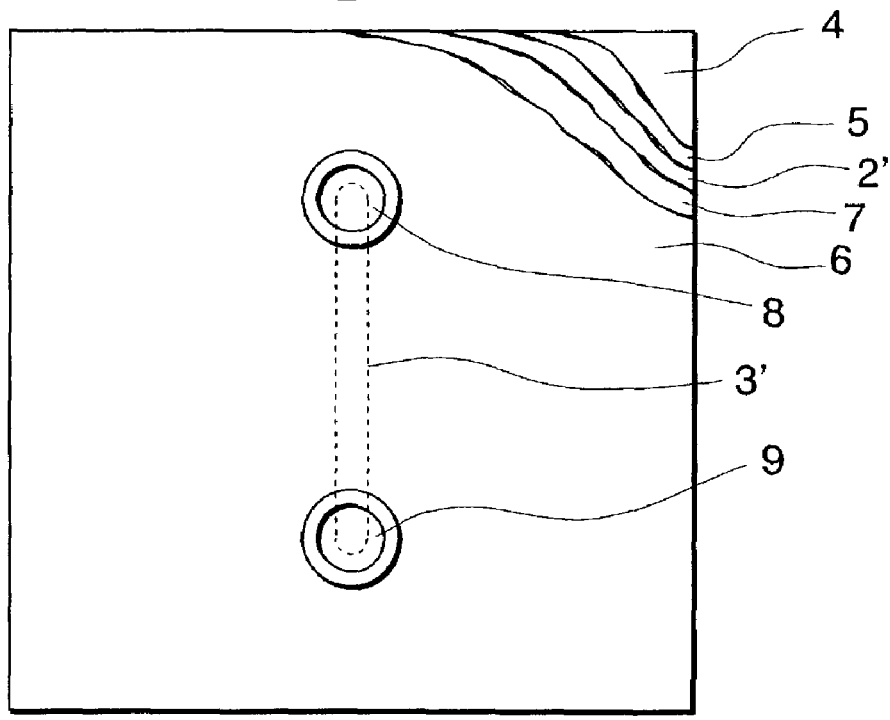
FIG. 2 is a plan view schematically showing a microdevice of the present invention manufactured in Example 1 and Example 3.
Figure 3:
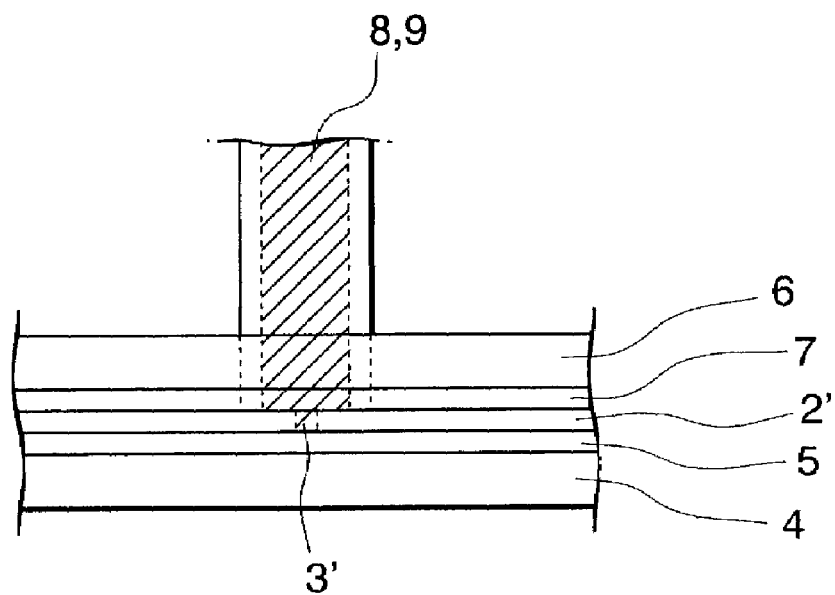
FIG. 3 is a partially enlarged elevation view schematically showing a microdevice of the present invention manufactured in Example 1 and Example 3.

At both ends of the capillary cavity (3'), an orifice having a diameter of 1.6 mm was made in the member (K-1) (6) and the adhesive resin layer (7) using a drill and a stainless steel pipe having a diameter of 1.6 mm was bonded using an epoxy resin to form an inlet (8) and an outlet (9), thereby manufacturing a microdevice (D-1) having the capillary cavity (3') therein as shown in FIG. 2 and FIG. 3.

Leakage Test

Water was poured through the inlet (8) of the microdevice (D-1) and, after closing the outlet (9), the microdevice was allowed to stand for one hour in a state where a pressure of 0.1 MPa is applied in the cavity. As a result, leakage of water was not recognized.

Observation of Cavity Portion

The microdevice (D-1) was cut and observed by a scanning electron microscope (SEM). As a result, the capillary cavity (3') had a rectangular cross section of 95 µm in width and 60 µm in height.

Example 2

In this Example, the method of the present invention using a member (J) having a recessed cut portion on the surface will be described.

Manufacture of Member (J)

A member (J-2) was manufactured by interposing a plate having dimensions of 5 cm×5 cm×3 mm (thickness) made of polystyrene ("DICSTYRENE XC-520", manufactured by Dainippon Ink and Chemicals, Inc.) and a mold made of a silicon wafer between glass plates, fastening them with a spring clamp, heating in a hot-air oven at 120° C. for about 2 hours, cooling to room temperature, removing the mold and the glass plates to form a groove-shaped recessed portion having the same shape and length as those in Example 1, except that a groove has a width of 50 µm and a depth of 25 µm, on the surface of a polystyrene plate.

Formation of Semi-Cured Coating Film

In the same manner as in Example 1, except that a pattern of exposure has a configuration such that each orifice having a diameter of 300 µm is formed at the position corresponding to both ends of the groove formed on the member (J-2), a semi-cured coating film having two orifice-shaped cut portions on a coating substrate (steps (i), (ii) and (iii)).

Formation of Resin Layer (X-2)

The semi-cured coating film formed on the coating substrate was contacted with the groove-formed surface of the member (J'-2) while aligning them (step (iv)) and the semi-cured coating film was cured by irradiating with the same ultraviolet light as that used in the exposure without using a photomask for 30 seconds to form a resin layer (X-2) (the step (vi)). Then, the coating substrate was peeled off from the three-layered laminate (step (v)) to manufacture a microdevice (D-2) including a cavity having the same shape as that of the cavities in FIG. 2 and FIG. 3, wherein the resin layer (X-2), that is, a layer of a cured article made of the composition (x-1), which has the cut portion, that serves as an inlet and outlet, is bonded on the surface of the member (J-2).

Example 3

In this Example, a method of producing a microdevice of the present invention using a maleimide resin as the composition (x) by a method of peeling a coating substrate will be described. In the same manner as in Example 1, except that a composition (x-2) was used as the composition (x) in place of the composition (x-1) and a composition (x-2') was used in place of the composition (x-1') and, furthermore, the exposure time was 2 seconds, a microdevice (D-3) having the same structure as that in Example 1 was manufactured.

Example 4

In this Example, a microdevice comprising laminated three resin layers (X') having passages, which intersect three-dimensionally, therein, and a method of manufacturing the same, will be described.

Manufacture of Member (J-4-1)

In the very same manner as in Example 1, a member (J-4-1) wherein a semi-cured composition (x-1') resin layer (36) having no cut portion is formed on the surface of a base material (35) was manufactured.

Formation of Resin Layer (X'-4-1)

Figure 4:
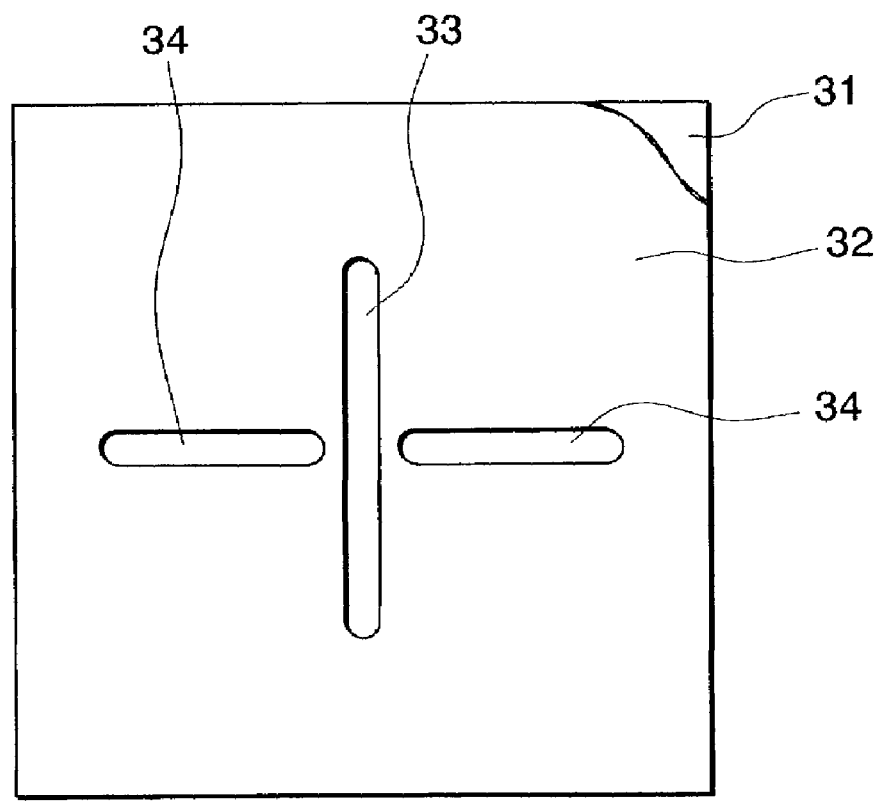
FIG. 4 is a plan view schematically showing a coating substrate and a resin layer (X'-4-1) used in Example 4.

In the same manner as in Example 1, except that the non-exposure portion comprises a non-exposure portion (33) having a width of 100 µm and a length of 30 mm and a non-exposure portion (34) wherein two straight lines having a width of 100 µm and a length of 14 mm are linearly arranged at a interval of 2 mm in a direction perpendicular to the non-exposure portion (33), as shown in FIG. 4, a semi-cured coating film (32) having the cut portions (33) and (34) of a coating film was formed on a coating substrate (31) and, after laminating on the surface of a member (J-4-1) (35), a resin layer (X'-4-1) (32') having cut portions (33') and (34') was formed by irradiating with ultraviolet light for 10 seconds to manufacture a member (J'-4-2).

Formation of Resin Layer (X'-4-2)

Figure 8:
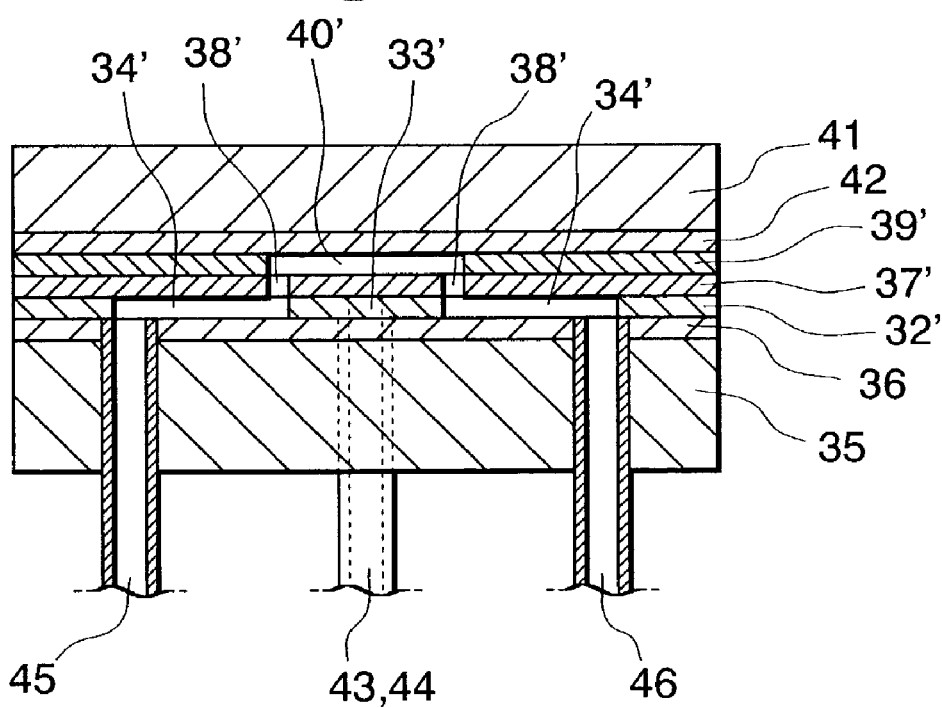
FIG. 8 is a sectional view taken along line A—A of FIG. 7, which schematically shows a microdevice manufactured in Example 4.

In the same manner as in the case of the formation of the resin layer (X'-4-1), except that the member (J'-4-2) was used in place of the member (J-4-1) and a non-exposure portion (38) comprises two circular portions formed at an interval of 2 mm, each having a diameter of 300 µm, which serve as a cut portion (38') serving as an interlaminar communicating passage, as shown in FIG. 8, a semi-cured coating film (37) having the cut portion (38) of a coating film was transferred onto the resin layer (X'-4-1) to form a resin layer (X'-4-2) (37') having the cut portion (38'), thereby manufacturing member (J'-4-3).

Formation of Resin Layer (X'-4-3)

In the same manner as in the case of the formation of the resin layer (X'-4-1), except that the member (J'-4-3) was used in place of the member (J-4-1) and a non-exposure portion (40) has a linear shape having a width of 100 µm and a length of 2 mm, which serves as a cut portion (40') for communicating two cut portions (34') in FIG. 8 via an interlaminar communicating passage (38'), a semi-cured coating film (39) having the cut portion (40) of a coating film onto the resin layer (X'-4-2) to form a resin layer (X'-4-3) having the cut portion (40').

Bonding of Member (K-4)

In the same manner as in Example 1, except that the resin layer (X'-4-3) was bonded in place of the resin layer (X-1), the same member (K-4) (41) as the member (K-1) in Example 1, bonding was performed using an adhesive resin layer (42).

Formation of Inlet and Outlet Portions

At both ends of the cut portion (33') of the resin layer (X'-4-1), an orifice having a diameter of 1.6 mm was made in the base material (35) and the resin layer (36) using a drill and a stainless steel pipe having a diameter of 1.6 mm was bonded to form an inlet (43) and an outlet (44), which communicate with the cut portion (33') of the resin layer (X'-4-1). Also, at both ends of the cut portion (34') of the resin layer (X'-4-1), an orifice having a diameter of 1.6 mm was made in the base material (35) and the resin layer (36) using a drill and a stainless steel pipe having a diameter of 1.6 mm was bonded to form an inlet (45) and an outlet (46), which communicate with the cut portion (34') of the resin layer (X'-4-1), to manufacture a microdevice (D-4).

Water Flow Test

Dye-colored water introduced from the inlet portion (45) flowed out through the liquid outlet portion (46) via cut portions (34'), (38'), (40'), (38') and (34'), while distilled water introduced through the inlet portion (43) flowed out through the outlet portion (44) via the cut portion (33') without mixing with the dye-colored water. As a result, it was confirmed that two independent passages intersect three-dimensionally.

Example 5

In this Example, a method of manufacturing a microdevice having a diaphragm valve function will be described.

Formation of Member (J-5-1)

In the very same manner as in the case of the member (J-1) manufactured in Example 1, a member (J-5-1) wherein a resin layer (55) having no cut portion is formed on a base material (54) made of polystyrene was manufactured.

Formation of Resin Layer (X-5-1)

In the same manner as in the case of the formation of the resin layer (X-1) in Example 1, except that the non-exposure portion has a different width, a resin layer (X-5-1) (52) having a cut portion (53') of about 200 μm in width was formed on the surface of the member (J-5-1) to manufacture a member (J-5-2).

Formation of Intermediate Layer

In the same manner as in the case of the formation of the resin layer (X-1) in Example 1, except that the member (J-5-2) was used in place of the member (J-1) and the composition (x-3) was used in place of the composition (x-1) and, furthermore, the entire surface was irradiated without using a photomask during the exposure, an intermediate layer (56) having no cut portion was formed on the resin layer (X-5-1).

Formation of Resin Layer (X-5-2)

Figure 9:
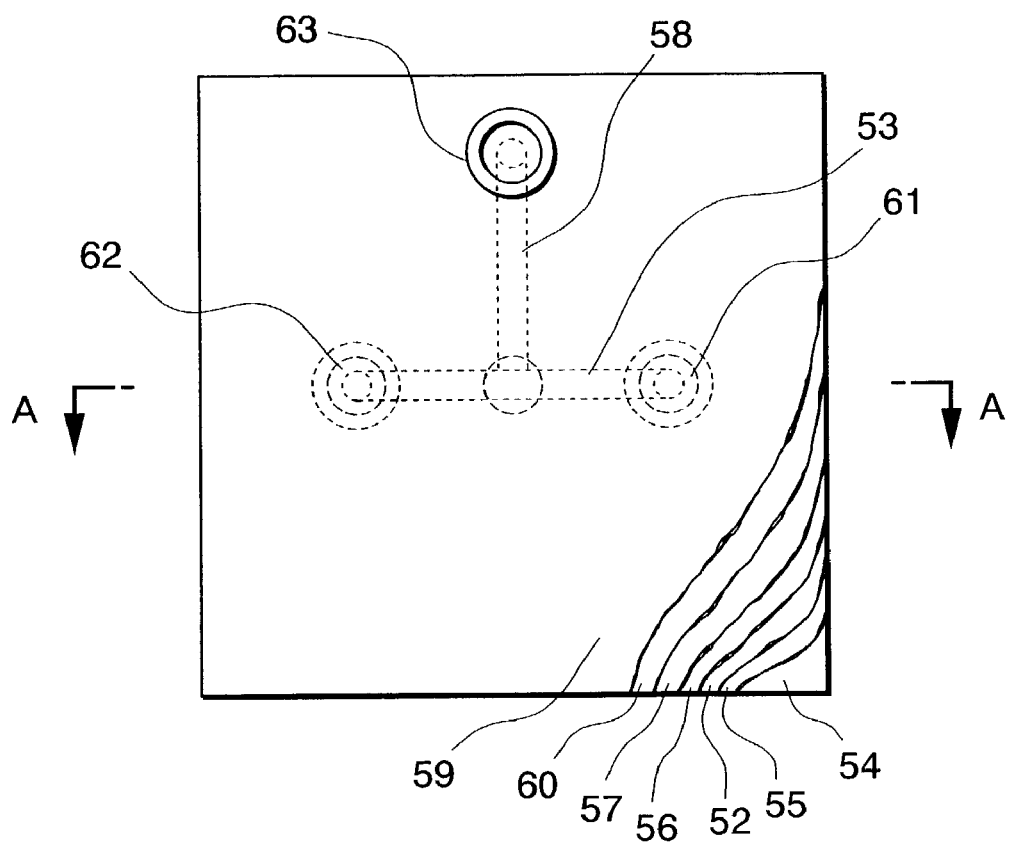
FIG. 9 is a plan view schematically showing a microdevice manufactured in Example 5.

In the same manner as in the case of the formation of the resin layer (X-1) in Example 1, except that a member (J-5-3) was used in place of the member (J-1) and the shape of the non-exposure portion is a pattern composed of a circular portion having a diameter of 1 mm at a center and a linear portion having a length of 15 mm and a width of 200 μm connected with the circular portion, which form a cut portion (58') as shown in FIG. 9, a resin layer (X-5-2) (57) was formed on the intermediate layer (56) to manufacture a member (J-5-4).

Bonding of Member (K-5)

In the same manner as in the case of the bonding of the member (K-1) in Example 1, except that the member was bonded with the resin layer (X-5-2) in place of the resin layer (X-1), the same member (K-5) (59) as the member (K-1) was bonded with the member (J-5-4) via an adhesive resin layer (60).

Formation of Inlet and Outlet

At both ends of the cut portion (53') of the resin layer (X-5-1), an orifice having a diameter of 5.1 mm was made in the member (J-5-1) using a drill and a vinyl chloride pipe having an outer diameter of 5 mm was bonded using an epoxy adhesive to form a liquid inlet portion (61) and a liquid outlet portion (62), which communicate with the cut portion (53') of the resin layer (X'-5-1).

Figure 10:
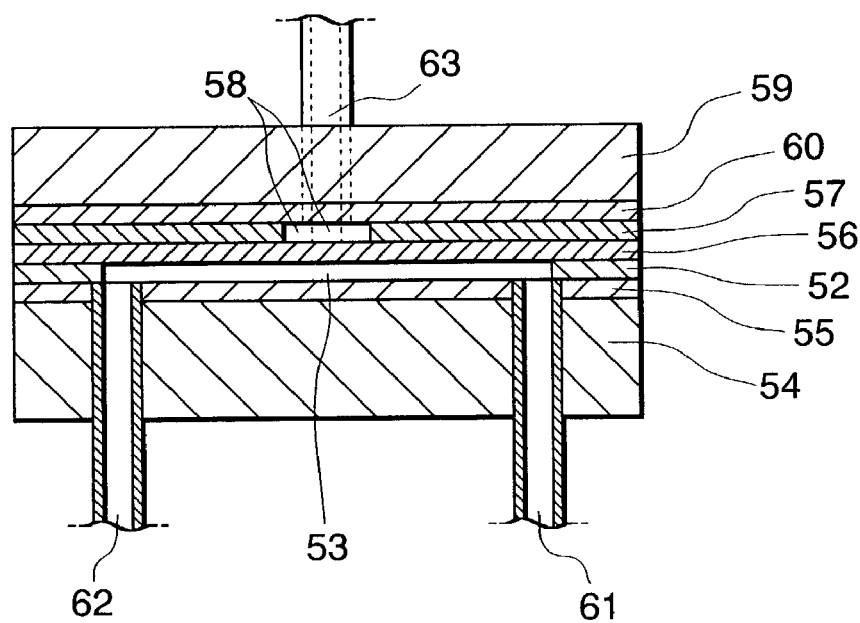
FIG. 10 is a sectional view taken along line A—A of FIG. 9, which schematically shows a microdevice manufactured in Example 5.

Also, at the external end of the cut portion (58') of the resin layer (X-5-2), an orifice having a diameter of 1.6 mm was made in the base material (59) and the resin layer (60) of the member (K-5) using a drill and a stainless steel pipe having an outer diameter of 1.6 mm was bonded using an epoxy adhesive to form a gas inlet portion (63) which communicates with the cut portion (58') of the resin layer (X-5-2) (57), thereby manufacturing a microdevice (D-5). A plan view schematically showing the microdevice thus manufactured is shown in FIG. 9 and a sectional view taken along line A—A in FIG. 9 is shown in FIG. 10.

Flow Rate Control Test

Water was introduced through a liquid inlet portion (61) under a pressure of about 10 kPa. While maintaining the state where water flows through a liquid outlet portion (62) open to the air, nitrogen at a pressure of 0.5 MPa was introduced from a gas introduction portion (63). As a result, the flow rate of water became zero. The flow rate of water could be controlled by changing the nitrogen pressure. Thus, it was confirmed that the microdevice can operate as an on-off valve and a flow rate control valve.

Example 6

In this Example, a method of manufacturing a microdevice of the present invention, which has a configuration such that the resin layer (X') is interposed between the member (J') and the member (K') each having a groove using the method of the present invention wherein the coating substrate is removed by dissolution will be described.

Manufacture of Coating Substrate

On the surface subjected to a corona discharge treatment of a 30 μm thick biaxially stretched polypropylene film (OPP film, manufactured by Futamura Chemical Industries Co., Ltd.), one surface of which is subjected to a corona discharge treatment, an aqueous 20% solution of polyvinyl alcohol (manufactured by Wako Pure Chemical Industries, Ltd., polymerization degree: 2000) was applied and hot air-dried at 40° C. and then vacuum-dried at 40° C. After peeling off from the OPP film, a polyvinyl alcohol film was formed, thereby manufacturing a coating substrate.

Manufacture of Member (J'-6)

Using the same melt replica method as in Example 2, a member (J'-6) having a recessed portion, which has a configuration such that the polystyrene plate (4) in Example 1, the resin layer (5) having no cut portion and the resin layer (X-1) having three linear cut portions shown in FIG. 4 are laminated.

Manufacture of Resin Layer (X') Precursor

Figure 5:
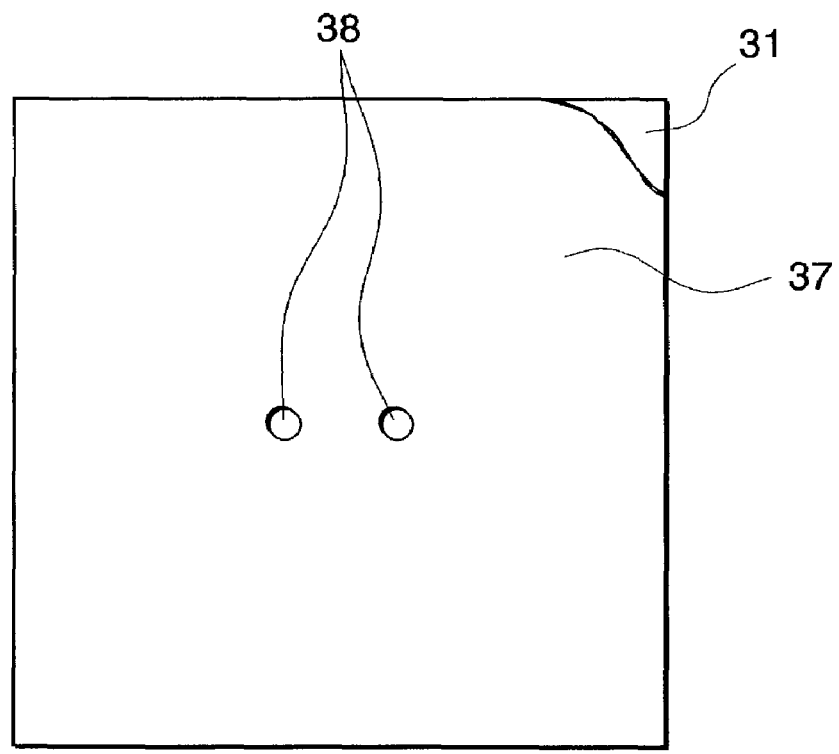
FIG. 5 is a plan view schematically showing a coating substrate and a resin layer (X'-4-2) used in Example 4.

In the same manner as in the steps (i), (ii) and (iii) of Example 2, except that the coating substrate is a polyvinyl alcohol film and the shape, which serves as the cut portion, is the same as those of two orifice-shaped cut portion (38) shown in FIG. 5, a semi-cured coating film was formed.

After the semi-cured coating film formed on the coating substrate was laminated with the member (J'-6), the coating substrate was dissolved and removed by washing with running water at 40° C. to form a resin layer (X'-6) precursor laminated with the member (J'-6) in a semi-cured state (steps (iv) and (v)).

Manufacture of Member (K')

Figure 6:
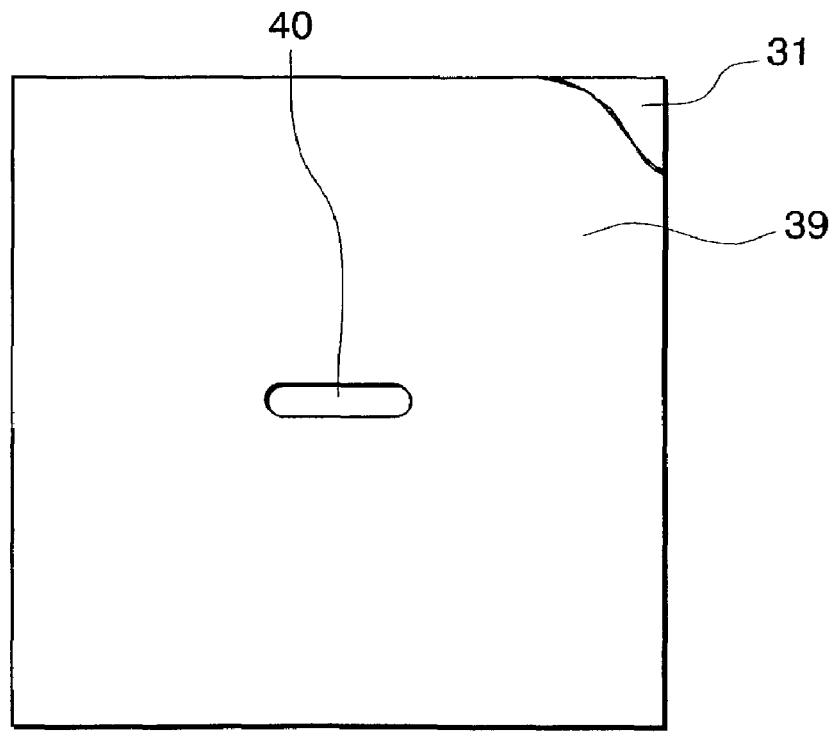
FIG. 6 is a plan view schematically showing a coating substrate and a resin layer (X'-4-3) used in Example 4.

In the same manner as in the case of the member (J'-6), except that the shape of the recessed cut portion on the surface is the same as that of the cut portion shown in FIG. 6, a member (K'-6) was manufactured.

Lamination and Bonding of Member (K')

On the resin layer (X'-6) precursor, the member (K'-6) was laminated and then irradiated with ultraviolet light for 40 seconds (step (vi)), thereby curing the resin layer (X'-6) precursor and bonding the member (J'-6) and the member (K'-6) with the resin layer (X'-6).

Formation of Other Structures

Figure 7:
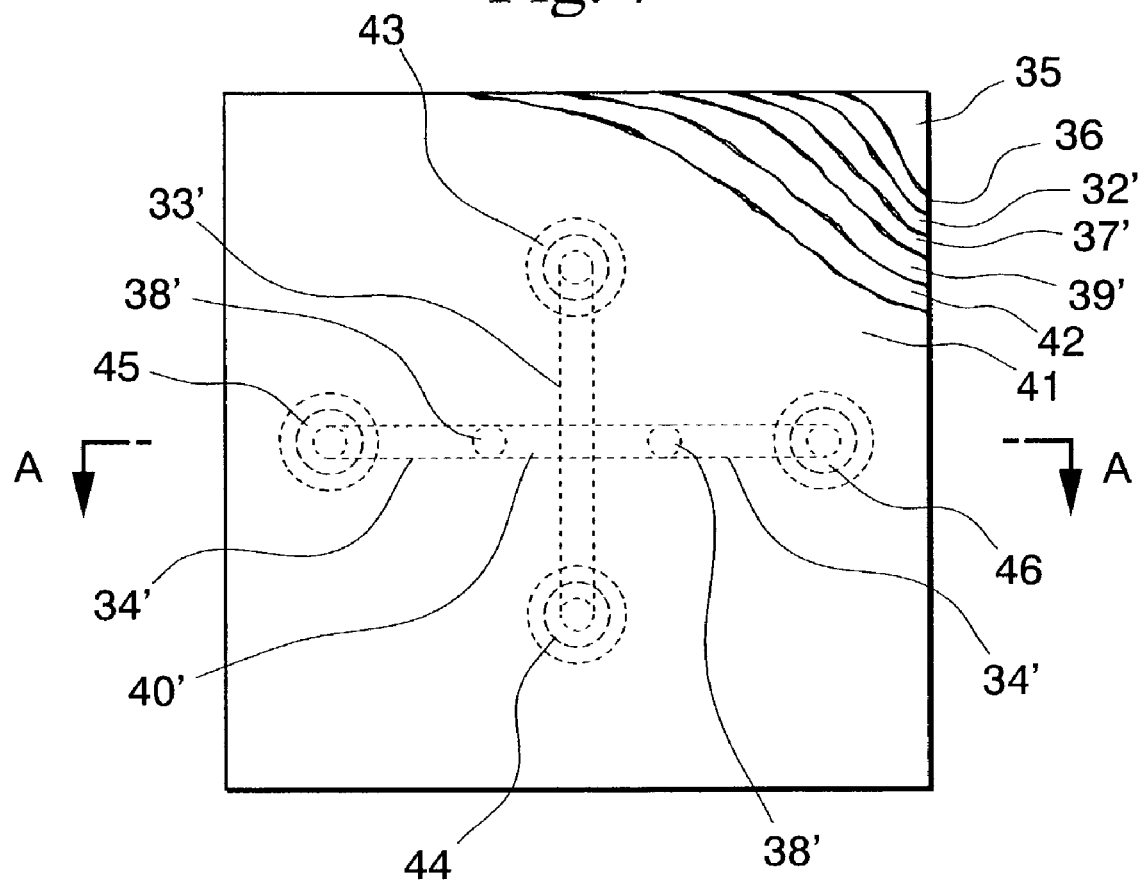
FIG. 7 is a plan view schematically showing a microdevice manufactured in Example 4.

In the same manner as in Example 1, a stainless steel pipe was bonded to the end of each respective passage to form an inlet portion and an outlet portion, thereby manufacturing a microdevice (D-6) having the same passage structure as that of the microdevice (D-4) shown in FIG. 7 and FIG. 8.

Example 7

In this Example, an example of manufacturing a microdevice of the present invention, wherein two resin layers (X') are laminated with the member (J') having a groove on the surface, by the method of the present invention, wherein the coating substrate is removed by dissolution, will be described.

Coating Substrate, Member (J'-7)

In the same manner as in Example 6, a coating substrate of a polyvinyl alcohol film was manufactured. As the member (J'), the same member as the member (J'-6) in Example 6 was used to manufacture a member (J'-7-1).

Manufacture of Member (J'-7-1)-Resin Layer (X'-7-1) Laminate

In the very same manner as in Example 6, the very same member as that of the member (J'-6) and the resin layer (X'-6) laminate, a laminate of the member (J'-7-1) and the resin layer (X'-7-1) precursor was manufactured.

Formation of Resin Layer (X'-7-2)

Using the same operation as described above, except that the laminate of the member (J'-7-1) and the resin layer (X'-7-1) precursor was used as a member (J'-7-2) and the shape of the cut portion is the same as that of the recessed cut portion of the member (K'-6) in Example 6, the resin layer (X'-7-2) precursor was laminated on the resin layer (X'-7-1) precursor to manufacture a member (J'-7-2).

Lamination and Bonding of Member (K'-7)

Using the polystyrene plate used in Example 6 as the member (K'-7), the member was laminated on the resin layer (X'-7-2) precursor, and then irradiated with ultraviolet light for 40 seconds, thereby curing resin layer (X'-7-1) precursor and resin layer (X'-7-2) precursor and bonding the member (J'-7), the resin layer (X'-7-1), the resin layer (X'-7-2) and the member (K'-7).

Formation of Other Structures

In the same manner as in Example 1, a stainless steel pipe was bonded to the end of each respective passage to form an inlet portion and an outlet portion, thereby manufacturing a microdevice (D-7) having the same passage structure as that of the microdevice (D-4) shown in FIG. 7 and FIG. 8.

Example 8

In this Example, an example of manufacturing a microdevice of the present invention which has a stopper and which functions as a pump by the method of the present invention will be described.

Manufacture of Member (J'-8-1)

A semi-cured coating film (72) having no cut portion was formed by applying a composition (x-1') on a plate having dimensions of 5 cm×5 cm×3 mm (thickness) made of polystyrene ("DICSTYRENE XC-520", manufactured by Dainippon Ink and Chemicals, Inc.) as a base material (71) and irradiating with ultraviolet light without using a photomask for one second.

Figure 11:
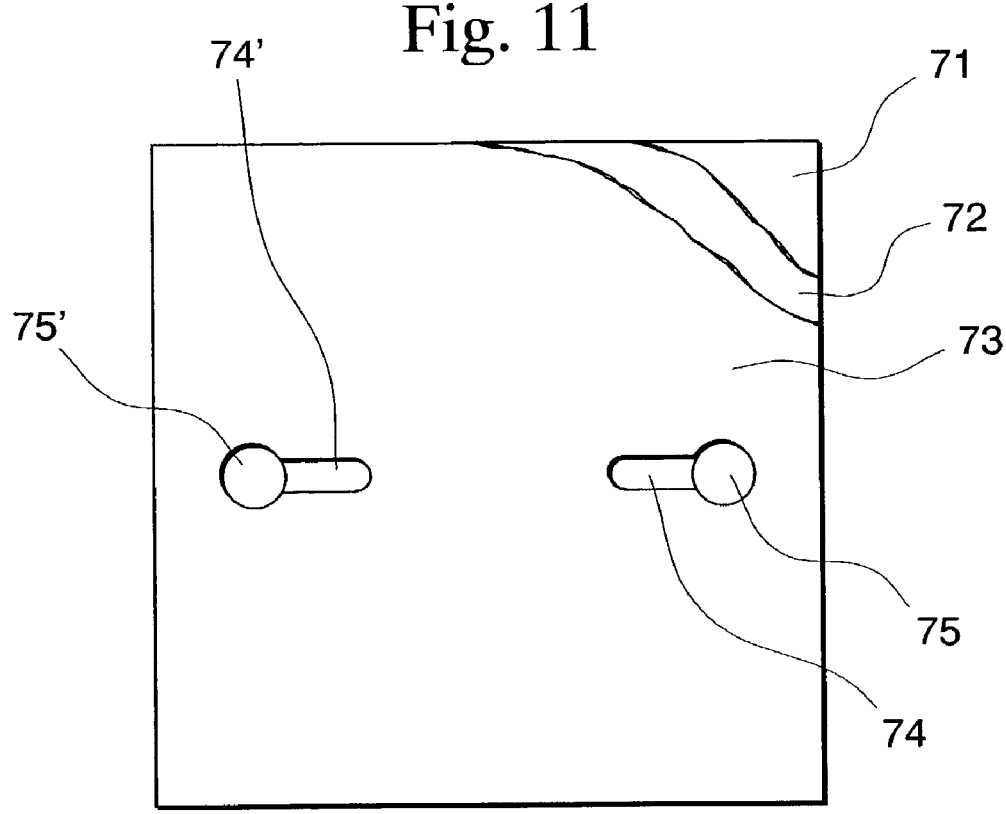
FIG. 11 is a plan view schematically showing a member (J'-8-1) manufactured in Example 8 viewed from a direction perpendicular to the surface on which a cut portion is formed.

Furthermore, a composition (x-1) was applied thereon and the portion other than the portion, which serves as a cut portion (74) shown in FIG. 11, was irradiated with ultraviolet light for 3 seconds using a photomask. Then, the uncured composition (x-1) of the non-irradiated portion was removed using methanol to form a resin layer (73) on which two recessed cut portions (74) and (74'), each having a width of 100 μm and a length of 10 mm, are arranged in series at a interval of 0.6 mm as the cut portion of the coating film. At both ends of the recessed cut portions (74) and (74') of the laminate, through holes (75) and (75'), each having a diameter of 3 mm, were made to manufacture a member (J'-8-1).

Formation of Resin Layer (X'-8-1)

Figure 12:
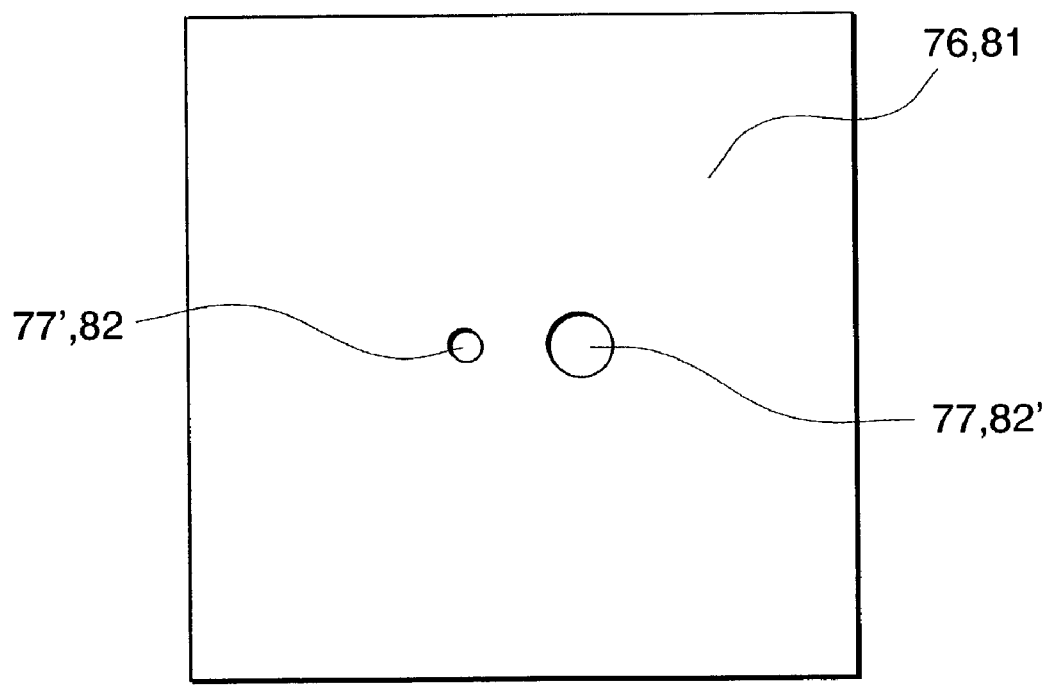
FIG. 12 is a plan view schematically showing a resin layer (X'-8-1) and a resin layer (X'-8-3) manufactured in Example 8.

In the same manner as in Example 1, except that the shape, which serves as the cut portion, is in the form of two orifices (77) and (77'), each having a diameter of 100 μm and a diameter of 600 μm, arranged at a center distance of 1 mm as shown in FIG. 12, a resin layer (X'-8-1) (76) including a cut portion having the above shape was laminated on the member (J'-8-1) by a method of peeling a coating substrate to manufacture a member (J'-8-2).

Formation of Resin Layer (X'-8-2)

Figure 13:
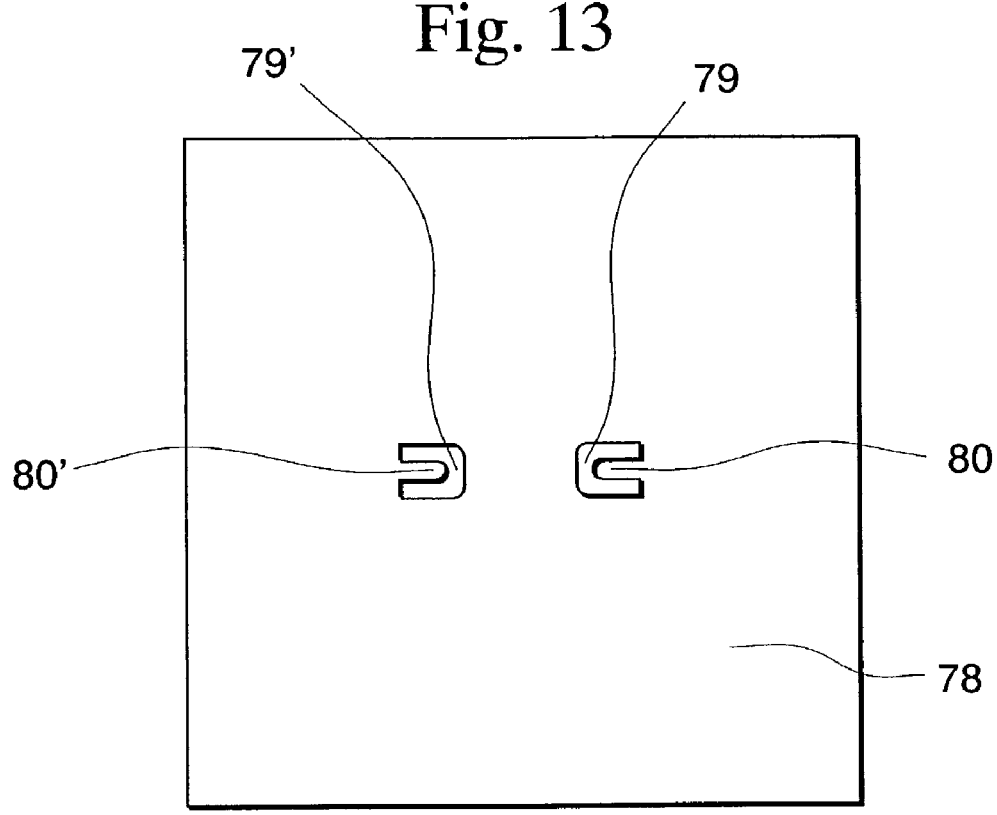
FIG. 13 is a plan view schematically showing a resin layer (X'-8-2) manufactured in Example 8.

In the same manner as in Example 6, except that a composition (x-3) was used as the composition (x) and the shape, which serves as a cut portion, is in the form of horseshoes (79) and (79'), each having a peripheral width of 100 μm, arranged in a center distance of 1 mm as shown in FIG. 13, the horseshoes serving as tongue-shaped stoppers (80) and (80'), each having a diameter of 400 μm, a semi-cured coating film was formed on a coating substrate (not shown).

Using a photomask, only portions, which serve as the tongue-shaped stoppers (80) and (80'), surrounded with the horseshoes-shaped cut portions (79) and (79') were further irradiated with ultraviolet light for 20 seconds, thereby curing the composition (x-3) of the irradiated portion and maintaining the other portion in a semi-cured state (step (iii')). In the same manner as in Example 6, a laminate, wherein a resin layer (X'-8-2) (78) is laminated on the member (J'-8-2), was obtained by the method of removing the coating substrate by dissolution to manufacture a member (J'-8-3).

Formation of Resin Layer (X'-8-3)

On the resin layer (X'-8-2) of the member (J'-8-3), a resin layer (X'-8-3) (81) formed in the same manner as in the case of the resin layer (X'-8-1) (76), except that positions of two orifices (82) and (82') having different sizes are reverse to those of two orifices (77) and (77') having different sizes of the resin layer (X'-8-1) (76) was laminated to manufacture a member (J'-8-4).

Formation of Resin Layer (X'-8-4)

Figure 14:
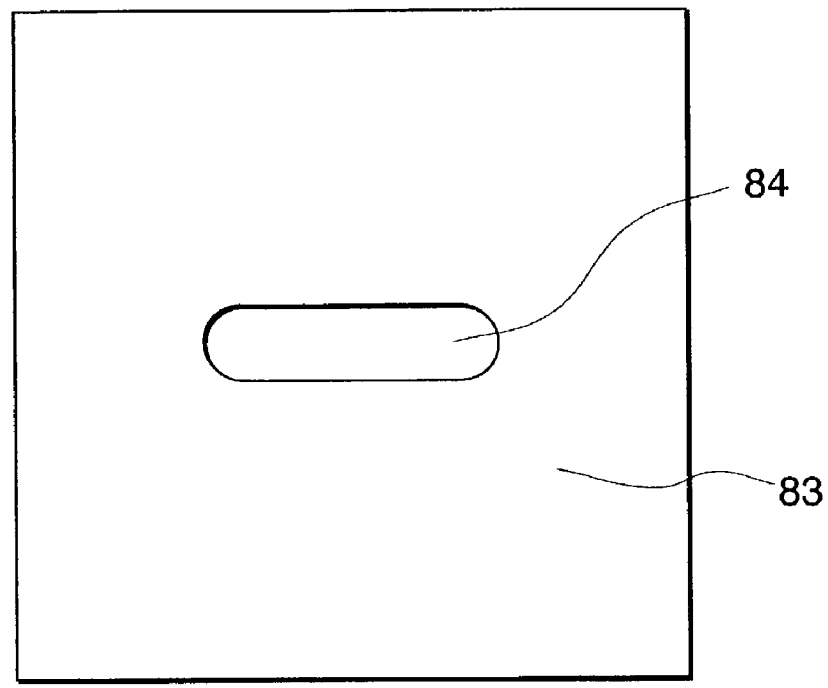
FIG. 14 is a view schematically showing a resin layer (X'-8-4) manufactured in Example 8.
Figure 15:
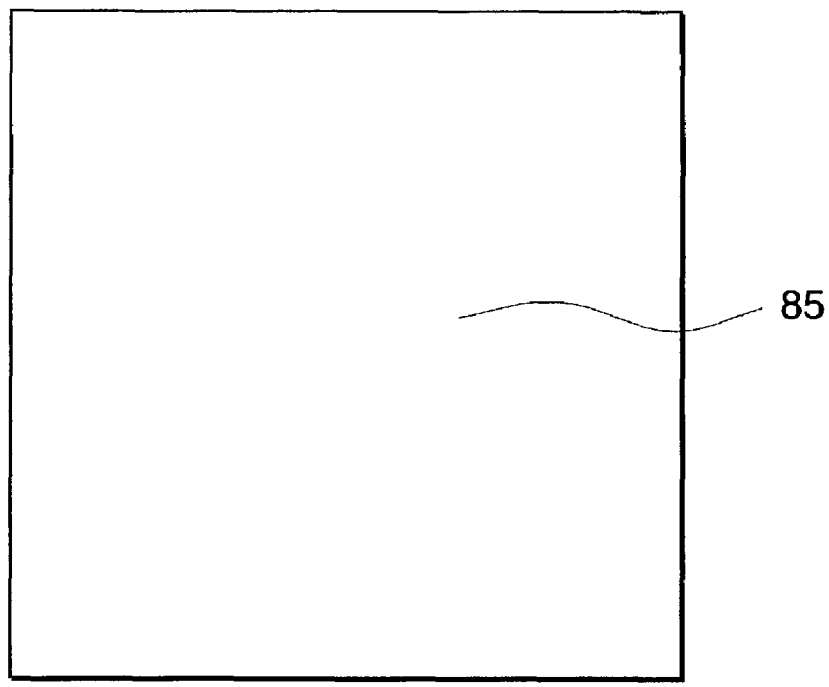
FIG. 15 is a plan view schematically showing an intermediate layer (diaphragm layer) manufactured in Example 8.

In the same manner as in the case of the resin layer (X'-8-1) (76), except that the shape of the cut portion (84) is a linear shape having a length of 1.5 mm and a width of 700 μm as shown in FIG. 14, a resin layer (X'-8-4) (83) was laminated on the resin layer (X'-8-3) (81) of the member (J'-8-4) to manufacture a member (J'-8-5).

Formation of Intermediate Layer

In the same manner as in the case of the formation of the intermediate layer (56) in Example 5, except that a member (J'-8-5) was used in place of the member (J'-5-2), an intermediate layer (85) (diaphragm layer) having no cut portion formed of a flexible material was laminated and bonded on the resin layer (X'-8-4).

Manufactured and Bonding of Member (K'-8)

Figure 16:
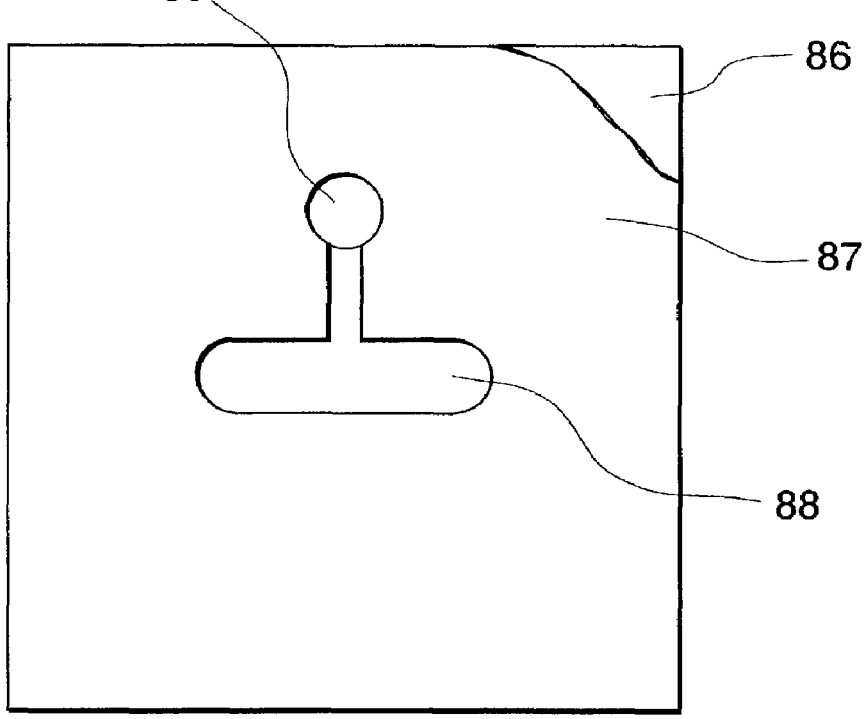
FIG. 16 is a plan view schematically showing a member (K'-8) manufactured in Example 8 viewed from a direction perpendicular to the surface on which a cut portion is formed.

As shown in FIG. 16, a member (K'-8), which is the same as the member (J'-8-1), except that the shape of the recessed cut portion (88) is a T-shape composed of a line having a length of 1.5 mm and a width of 700 µm and a line having a length of 10 mm and a width of 300 µm and one orifice-shaped cut portion (89) piercing through the member is provided at the end of a recessed cut portion having a width of 300 µm, was manufactured in the same manner as in the case of the member (J'-8-1). The member (K'-8) is formed as a laminate of a base material (86) made of polystyrene and a resin layer (87) having the cut portion (88).

The member (K'-8) was laminated on the intermediate layer (85) while aligning the cut portion (88) of the member with the position corresponding to the cut portion (84) of the resin layer (X'-8-4) across the intermediate layer (85), and then irradiated with ultraviolet light for 30 seconds, thereby bonding with the intermediate layer (85), to manufacture a diaphragm. Also, the other resin layer was sufficiently cured by irradiation with ultraviolet light.

Formation of Inlet and Outlet Portions

Figure 17:
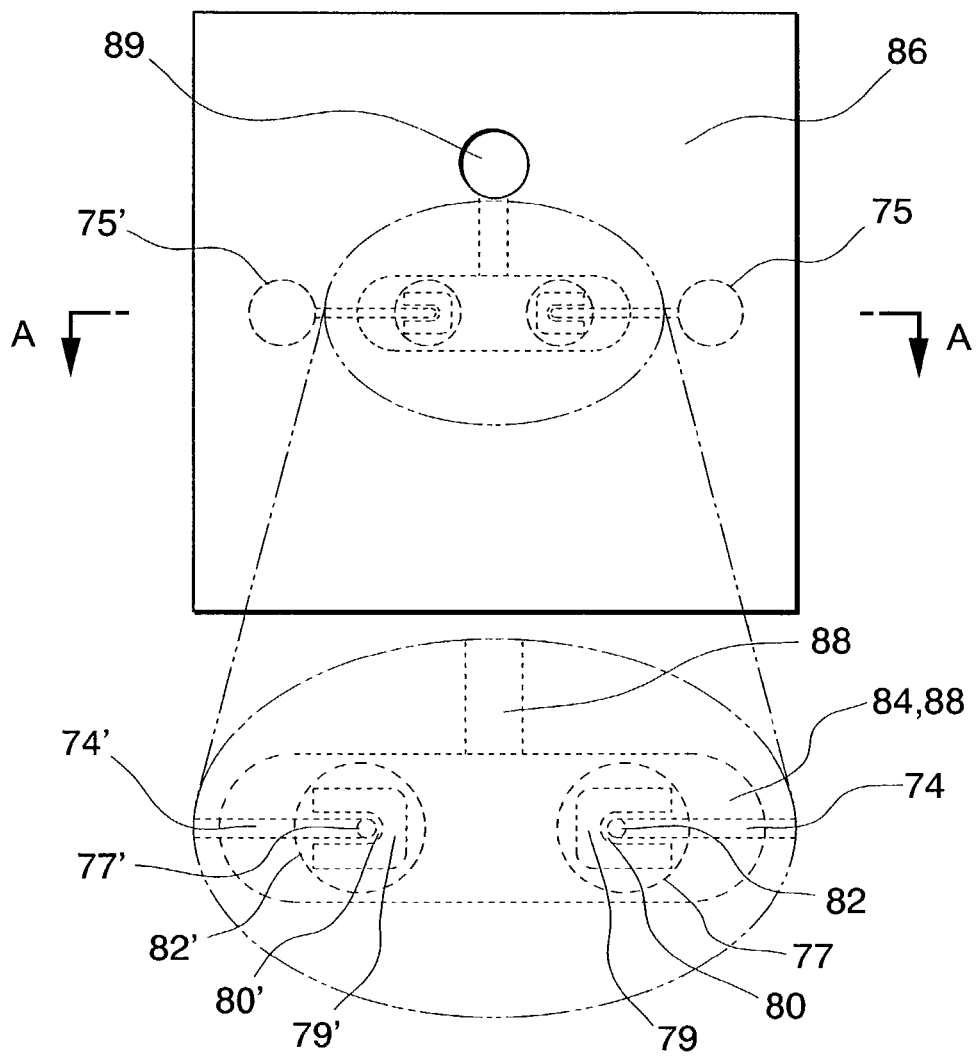
FIG. 17 is a plan view schematically showing a microdevice manufactured in Example 8.
Figure 18:
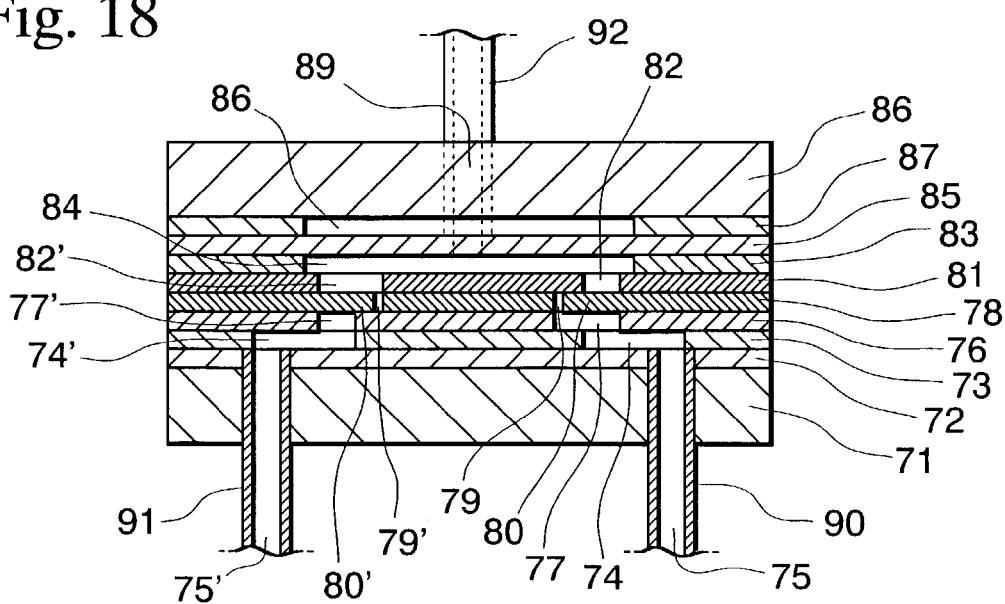
FIG. 18 is a sectional view taken along line A—A of FIG. 17, which schematically shows a microdevice manufactured in Example 8.

A vinyl chloride pipe having an outer diameter was bonded with orifices (75), (75') and (89) provided on the member (J'8) and the member (K'-8) using an epoxy adhesive to form a liquid inlet portion (90), a liquid outlet portion (91) and a gas introduction portion (92), thereby manufacturing a microdevice (D-8). A plan view schematically showing the microdevice thus manufactured is shown in FIG. 17 and an elevation view schematically showing the microdevice is shown in FIG. 18.

Liquid Delivery Test

Water was introduced through a liquid inlet portion (90). As a result, water flowed out through a liquid outlet portion (91) open to the air. In contrast, even if water was introduced into the liquid outlet portion (91), water did not flow out through the liquid inlet portion (90). Then, nitrogen at 0.5 MPa was intermittently introduced into the liquid inlet portion (92). As a result, water was drawn through the liquid inlet portion (90) and flowed out through liquid inlet portion (91). Thus, it was confirmed that the microdevice operated as a pump.

Example 9

In this Example, an example of a microdevice having a diaphragm valve function, which has a structure such that the diaphragm is not bonded but is contacted with the adjacent member, and a method of manufacturing the same will be described.

Manufacture of Microdevice

In the same manner as in Example 5, except that the shape of the non-irradiated portion of the resin layer (X-5-1) is in the form of two orifices corresponding to the liquid inlet portion (61) and the liquid outlet portion (62) and the portion corresponding to the non-irradiated portion of the resin layer (X-5-1) in Example 5, was cured by irradiating with ultraviolet light after the removal of the uncured resin of the non-irradiated portion of the resin layer (X-5-1) and before laminating the intermediate layer (56), and that the portion, which severs as the diaphragm of the intermediate layer (56), that is, the shape of the cavity (53) of Example 5 was irradiated with ultraviolet light, thereby curing the irradiated portion, and the intermediate layer (56) corresponds to the member (K") in the microdevice of the present invention, the same microdevice as that manufactured in Example 5, except that the cavity (53) of Example 5 has a zero thickness, was manufactured.

Water Flow Test

Water was introduced through a liquid inlet portion (61) under a pressure of about 5 kPa. As a result, water did not flow through a liquid outlet portion (62) open to the air. The pressure increased to 15 kPa, water flowed out through the liquid outlet portion (62). While maintaining this state, nitrogen at a pressure of 0.5 MPa was introduced from a gas introduction portion (63). As a result, the flow rate of water became zero. The flow rate of water could be controlled by changing the nitrogen pressure. Thus, it was confirmed that the microdevice can operate as a check valve, an on-off valve, and a flow rate control valve.

INDUSTRIAL APPLICABILITY

The present invention can provide a method of manufacturing a microdevice having a fine capillary cavity formed as a cut portion of a very thin layer which is likely to be broken, particularly a method of manufacturing a microdevice having complicated passages formed in three dimensions with high productivity, and a multi-functional microdevice which has a fine capillary passage formed by laminating plural resin layers, fine capillary cavities piercing through the respective layers to communicate and intersect three-dimensionally with each other, a space which should serve as a reaction chamber, a diaphragm valve, and a stopper structure.

The invention claimed is:

1. A method of manufacturing a microdevice having a laminated structure comprising one or more resin layers (X) having a cut portion, said resin layers being laminated with another member or another resin layer (X) to form a cavity composed of the cut portion, said method comprising:
   (i) the step (i) of applying an active energy ray curable composition (x) containing a radiation polymerizable compound (a) on a coating substrate to form an uncured coating film,
   (ii) the step (ii) of irradiating a portion of the uncured coating film with an active energy ray, thereby making the active energy ray curable composition in the portion of the film non-flowable or slightly flowable, and semi-cured to such an extent that unreacted active energy ray polymerizable functional groups in the composition can remain, wherein the portion, and a non-irradiated portion of the film, which serves as the cut portion, constitute a semi-cured coating film,
   (iii) the step (iii) of removing the uncured composition (x) of the non-irradiated portion from the semi-cured coating film to obtain a semi-cured coating film having a cut portion of the coating film,
   (iv) the step (iv) of laminating the semi-cured coating film having a cut portion with another member (J) to form a resin layer (X),
   (v) the step (v) of removing the coating substrate from the resin layer (X), thereby transfering the resin layer (X) onto the member (J), and
   (vi) the step (vi) of irradiating the resin layer (X) in a semi-cured state with an active energy ray, thereby further curing the resin later (X) and bonding the resin layer (X) with the member (J) after the step (iv) and before and/or after the step (v).

2. The method of manufacturing a microdevice according to claim 1, wherein the removal of the coating substrate in the step (v) is removal by dissolution of the coating substrate.

3. The method of manufacturing a microdevice according to claim 1, wherein the step (vi) is provided before the step (v) and the removal of the coating substrate in the step (v) is performed by peeling.

4. The method of manufacturing a microdevice according to claim 1, wherein, after performing the steps (i), (ii), (iii), (iv) and (v), or the steps (i), (ii), (iii), (iv), (v) and (vi), or the steps (i), (ii), (iii), (iv), (vi) and (v) in this order, the steps (i) to (v) or the steps (i) to (vi) are repeated using the member (J) laminated with the resin layer (x) in place of the member (J) in the step (iv), thereby laminating plural resin layers (X).

5. The method of manufacturing a microdevice according to claim 1, wherein plural resin layers (X) are laminated so that at least the cut portions are partially laid one upon another to form a cavity composed of the connected cut portions of plural resin layers (X) in a laminate.

6. The method of manufacturing a microdevice according to claim 1, wherein the member (J) is a member having a cut portion piercing through the member, or a member having a recessed cut portion on the surface, or a member having a cut portion piercing through the member and a recessed cut portion on the surface, and the member (J) and the resin layer (X) are laminated so that at least the cut portion of the member (J) and the cut portion of the resin layer (X) are partially laid one upon another to form a cavity composed of the cut portion of the member (J) and the cut portion of the resin layer (X), which are connected with each other, in a laminate.

7. The method of manufacturing a microdevice according to claim 1, wherein the step (vi) follows the step (v) and, in the step (vi), the resin layer (X) in a semi-cured state is irradiated with an active energy ray while being contacted with another member (K), thereby bonding the resin layer (X) with the member (J) and bonding with the another member (K).

8. The method of manufacturing a microdevice according to claim 7, wherein the member (K) has a cut portion piercing through the member and/or a recessed cut portion on the surface and the member (K) and the resin layer (X) are laminated so that the cut portion of the member (K) and the cut portion of the resin layer (X) are partially laid one upon another, thereby forming a cavity composed of the cut portion of the member (K) and the cut portion of the resin layer (X), which are connected with each other, in a laminate.

9. The method of manufacturing a microdevice according to claim 1, wherein, between the step (i) and the step (ii) and/or between the step (ii) and the step (iii) and/or between the step (iii) and the step (iv), a portion of the resin layer (X) is irradiated with an active energy ray, thereby partially curing the resin layer so that the irradiated portion is not bonded with another member in the step (iv) to form a portion, which is not bonded but is contacted with the another member or resin layer, in the resin layer (X).

10. The method of manufacturing a microdevice according to claim 9, wherein irradiation with the active energy ray in the step (ii) is performed in the shape for forming a stopper to provide a portion of the resin layer (X) with a structure, which serves as the stopper, and the portion subjected to partial curing is a portion which serves as the stopper of the resin layer (X).

11. The method of manufacturing a microdevice according to claim 1, wherein a thickness of the resin layer (X) is within a range from 1 to 1000 µm.

12. The method of manufacturing a microdevice according to claim 1, wherein a minimum width of the cut portion of the resin layer (X) is within a range from 1 to 1000 µm.

13. The method of manufacturing a microdevice according to claim 1, wherein the radiation polymerizable compound (a) is a compound having two or more active energy ray polymerizable functional groups in a molecule.

14. The method of manufacturing a microdevice according to claim 13, wherein the radiation polymerizable compound (a) having an acryloyl group or a maleimide group.

15. The method of manufacturing a microdevice according to claim 1, wherein the active energy ray curable composition (x) contains a hydrophobic radiation polymerizable compound (a) whose homopolymer exhibits a contact angle with water of 60 degrees or more, and an amphipathic polymerizable compound (b) which is copolymerizable with the hydrophobic radiation polymerizable compound.

16. The method of manufacturing a microdevice according to claim 15, wherein the amphipathic polymerizable compound (b) is a compound having a polyethylene glycol chain of a repeating number of 6 to 20 and an alkyl group having 6 to 20 carbon atoms in the molecule.

17. The method of manufacturing a microdevice according to claim 1, wherein the member (J) is formed of a polymer selected from the group consisting of styrene polymer, (meth)acrylate polymer, polycarbonate polymer, polysulfone polymer and polyester polymer.

* * * * *